(12) United States Patent
Sasaki et al.

(10) Patent No.: US 8,467,147 B2
(45) Date of Patent: Jun. 18, 2013

(54) MAGNETIC HEAD FOR PERPENDICULAR MAGNETIC RECORDING AND METHOD OF MANUFACTURING SAME

(75) Inventors: Yoshitaka Sasaki, Milpitas, CA (US); Hiroyuki Itoh, Milpitas, CA (US); Shigeki Tanemura, Milpitas, CA (US); Tatsushi Shimizu, Hong Kong (CN); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 1587 days.

(21) Appl. No.: 11/546,961

(22) Filed: Oct. 13, 2006

(65) Prior Publication Data
US 2008/0088972 A1 Apr. 17, 2008

(51) Int. Cl.
*G11B 5/127* (2006.01)
(52) U.S. Cl.
USPC ............... 360/110; 360/123.12; 360/125.02; 360/125.04
(58) Field of Classification Search
USPC ............... 360/123.12, 125.02, 125.04, 110
See application file for complete search history.

(56) References Cited

U.S. PATENT DOCUMENTS

| 4,656,546 A | 4/1987 | Mallory |
| 4,672,493 A | 6/1987 | Schewe |
| 6,504,675 B1 | 1/2003 | Shukh et al. |
| 6,618,227 B2 | 9/2003 | Yano et al. |
| 6,724,572 B1* | 4/2004 | Stoev et al. ............ 360/125.43 |
| 6,809,899 B1* | 10/2004 | Chen et al. ............ 360/125.13 |
| 6,813,116 B2 | 11/2004 | Nakamura et al. |
| 6,954,340 B2* | 10/2005 | Shukh et al. ................ 360/317 |
| 7,193,815 B1* | 3/2007 | Stoev et al. ............ 360/125.12 |
| 2004/0004786 A1* | 1/2004 | Shukh et al. ................ 360/126 |
| 2005/0024771 A1* | 2/2005 | Le ................................ 360/126 |
| 2005/0128637 A1* | 6/2005 | Johnston et al. ............ 360/125 |
| 2005/0141137 A1* | 6/2005 | Okada et al. ................ 360/122 |
| 2005/0190479 A1* | 9/2005 | Terris et al. .................... 360/59 |
| 2006/0002020 A1 | 1/2006 | Pokhil et al. |
| 2006/0087765 A1* | 4/2006 | Iwakura et al. ............ 360/125 |
| 2006/0171068 A1* | 8/2006 | Taguchi ...................... 360/125 |

FOREIGN PATENT DOCUMENTS

| JP | A-2002-100006 | 4/2002 |
| JP | A 2003-242607 | 8/2003 |
| JP | A 2005-190518 | 7/2005 |
| JP | A 2006-18988 | 1/2006 |

* cited by examiner

*Primary Examiner* — Hoa T Nguyen
*Assistant Examiner* — Carlos E Garcia
(74) *Attorney, Agent, or Firm* — Oliff & Berridge, PLC

(57) ABSTRACT

A magnetic head comprises a pole layer, a first coil, a second coil, and a shield. The shield incorporates: a first portion located backward of the pole layer along the direction of travel of a recording medium; a second portion located forward of the pole layer along the direction of travel of the recording medium; and two coupling portions. The first portion has an end face located in a medium facing surface. The two coupling portions couple the first and second portions to each other without touching the pole layer. Part of the first coil passes through a space surrounded by the pole layer and the first portion. Part of the second coil passes through a space surrounded by the pole layer and the second portion.

16 Claims, 30 Drawing Sheets

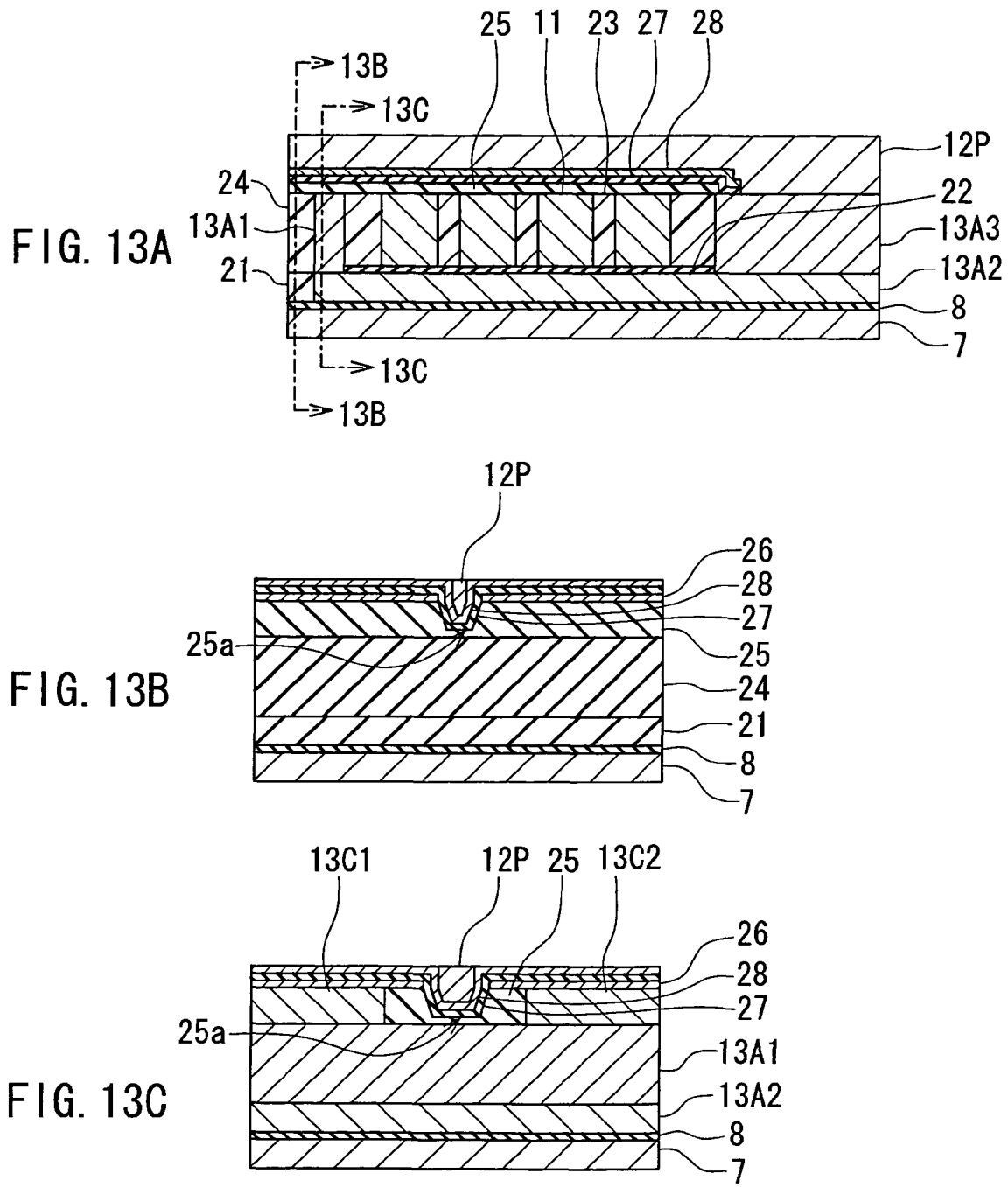

MAGNETIC HEAD FOR PERPENDICULAR MAGNETIC RECORDING AND METHOD OF MANUFACTURING SAME

BACKGROUND OF THE INVENTION

1. Field of the Invention

The present invention relates to a magnetic head for perpendicular magnetic recording that is used for writing data on a recording medium by means of a perpendicular magnetic recording system and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

Like magnetic heads for longitudinal magnetic recording, magnetic heads for perpendicular magnetic recording typically used have a structure in which a reproducing (read) head having a magnetoresistive element (that may be hereinafter called an MR element) for reading and a recording (write) head having an induction-type electromagnetic transducer for writing are stacked on a substrate. The write head comprises a magnetic pole layer that produces a magnetic field in the direction orthogonal to the surface of the recording medium.

For the perpendicular magnetic recording system, it is an improvement in recording medium and an improvement in write head that mainly contributes to an improvement in recording density. It is a reduction in track width and an improvement in write characteristics that is particularly required for the write head to achieve higher recording density. On the other hand, if the track width is reduced, the write characteristics, such as an overwrite property that is a parameter indicating an overwriting capability, suffers degradation. It is therefore required to achieve better write characteristics as the track width is reduced.

A magnetic head used for a magnetic disk drive such as a hard disk drive is typically provided in a slider. The slider has a medium facing surface that faces toward a recording medium. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt of the magnetic head with respect to the tangent of the circular track, which is called a skew, occurs according to the position of the magnetic head across the tracks.

In a magnetic disk drive of the perpendicular magnetic recording system that exhibits a better capability of writing on a recording medium than the longitudinal magnetic recording system, in particular, if the above-mentioned skew occurs, problems are encountered, such as an occurrence of a phenomenon in which data stored on an adjacent track is erased when data is written on a specific track (that is hereinafter called adjacent track erase), or unwanted writing between adjacent two tracks. To achieve higher recording density, it is required to suppress adjacent track erase. Unwanted writing between adjacent two tracks affects detection of servo signals for alignment of the magnetic head and the signal-to-noise ratio of a read signal.

A technique is known for preventing the above-described problems resulting from the skew, as disclosed in U.S. Pat. No. 6,504,675 B1, for example. According to this technique, an end face of the pole layer located in the medium facing surface is made to have a shape in which one of the sides of the end face located backward along the direction of travel of the recording medium (that is, the side located closer to the air inflow end of the slider) is shorter than the opposite side.

As a magnetic head for perpendicular magnetic recording, a magnetic head comprising the pole layer and a shield is known, as disclosed in U.S. Pat. No. 4,656,546, for example. In the medium facing surface of this magnetic head, an end face of the shield is located forward of the end face of the pole layer along the direction of travel of the recording medium with a specific small space therebetween. Such a magnetic head will be hereinafter called a shield-type head. In the shield-type head, a magnetic flux generated from the end face of the pole layer and extending in directions except the direction orthogonal to the surface of the recording medium is prevented from reaching the recording medium by the shield. In addition, the shield has a function of returning a magnetic flux that has been generated from the end face of the pole layer and has magnetized the recording medium. The shield-type head achieves a further improvement in linear recording density.

U.S. Pat. No. 4,672,493 discloses a magnetic head having such a structure that magnetic layers are respectively provided forward and backward of a middle magnetic layer to be a pole layer along the direction of travel of a recording medium and that coils are respectively provided between the middle magnetic layer and the magnetic layer located forward and between the middle magnetic layer and the magnetic layer located backward. In this magnetic head each of the three magnetic layers has an end face located in the medium facing surface. According to this magnetic head, it is possible to increase components in the direction orthogonal to the surface of the recording medium among components of the magnetic field generated from the end of the middle magnetic layer located in the medium facing surface.

U.S. Pat. No. 6,954,340 B2 discloses a magnetic head having such a structure that return poles are respectively provided forward and backward of a main pole to be a pole layer along the direction of travel of a recording medium and that coils are respectively provided between the main pole and the return pole located forward and between the main pole and the return pole located backward. This magnetic head has two side shields that connect the two return poles to each other and that are disposed on both sides of the main pole opposed to each other in the direction of track width. In the magnetic head each of the main pole, the two return poles and the two side shields has an end face located in the medium facing surface. In the medium facing surface of the magnetic head, the distance between the end face of the main pole and that of the return pole located forward is smaller than the distance between the end face of the main pole and that of the return pole located backward.

Reference is now made to FIG. 33 to describe a basic configuration of the shield-type head. FIG. 33 is a cross-sectional view of the main part of an example of the shield-type head. This shield-type head comprises: a medium facing surface 100 that faces toward a recording medium; a coil 101 for generating a magnetic field corresponding to data to be written on the medium; a pole layer 102 having an end located in the medium facing surface 100, allowing a magnetic flux corresponding to the field generated by the coil 101 to pass, and generating a write magnetic field for writing the data on the medium by means of the perpendicular magnetic recording system; a shield layer 103 having an end located in the medium facing surface 100 and having a portion located away from the medium facing surface 100 and coupled to the pole layer 102; a gap layer 104 provided between the pole layer 102 and the shield layer 103; and an insulating layer 105 covering the coil 101. An insulating layer 106 is disposed around the pole layer 102. The shield layer 103 is covered with a protection layer 107.

In the medium facing surface 100, the end of the shield layer 103 is located forward of the end of the pole layer 102 along the direction T of travel of the recording medium with a specific space created by the thickness of the gap layer 104. At least part of the coil 101 is disposed between the pole layer 102 and the shield layer 103 and insulated from the pole layer 102 and the shield layer 103.

The coil 101 is made of a conductive material such as copper. The pole layer 102 and the shield layer 103 are made of a magnetic material. The gap layer 104 is made of an insulating material such as alumina ($Al_2O_3$). The insulating layer 105 is made of photoresist, for example.

In the head of FIG. 33, the gap layer 104 is disposed on the pole layer 102 and the coil 101 is disposed on the gap layer 104. The coil 101 is covered with the insulating layer 105. One of the ends of the insulating layer 105 closer to the medium facing surface 100 is located at a distance from the medium facing surface 100. In the region from the medium facing surface 100 to the end of the insulating layer 105 closer to the medium facing surface 100, the shield layer 103 faces toward the pole layer 102 with the gap layer 104 disposed in between. Throat height TH is the length (height) of the portions of the pole layer 102 and the shield layer 103 facing toward each other with the gap layer 104 disposed in between, the length being taken from the end closer to the medium facing surface 100 to the other end. The throat height TH influences the intensity and distribution of the field generated from the pole layer 102 in the medium facing surface 100.

The location of the end of a bit pattern to be written on a recording medium by the head of FIG. 33 is determined by the location of an end of the end face of the pole layer 102 located in the medium facing surface 100, the end being located forward along the direction T of travel of the recording medium. At a location forward of the end face of the pole layer 102 along the direction T of travel of the recording medium, the shield layer 103 takes in a magnetic flux generated from the end face of the pole layer 102 and extending in directions except the direction orthogonal to the surface of the recording medium. The shield layer 103 thereby prevents this flux from reaching the recording medium. As a result, it is possible to prevent a direction of magnetization of the bit pattern already written on the recording medium from being changed due to the effect of the above-mentioned flux.

In the shield-type head as shown in FIG. 33, for example, it is preferred to reduce the throat height TH to improve the overwrite property. It is required that the throat height TH be 0.1 to 0.3 micrometer ($\mu$m), for example. When such a small throat height TH is required, the following problems arise in the head of FIG. 33.

That is, when the head of FIG. 33 is in operation, the insulating layer 105 may expand due to the heat generated by the coil 101, and an end portion of the shield layer 103 closer to the medium facing surface 100 may thereby protrude. Particularly when the throat height TH is small, a portion of the shield layer 103 located between the insulating layer 105 and the medium facing surface 100 is thin, so that the end portion of the shield layer 103 closer to the medium facing surface 100 is more likely to protrude. The protrusion of the end portion of the shield layer 103 during operation of the head makes a collision of the slider with the recording medium occur more frequently.

Furthermore, for a shield-type head as the one shown in FIG. 33, for example, there are some cases in which such a phenomenon noticeably arises that there occurs attenuation of signals written on one or more tracks adjacent to the track that is a target of writing or reading in a wide range along the direction of track width (The phenomenon will be hereinafter called wide-range adjacent track erase). One of reasons for the occurrence of wide-range adjacent track erase is considered to be the following. In this shield-type head, the magnetic flux that has been generated from the end face of the pole layer 102 and has magnetized the recording medium returns to the shield layer 103. It is assumed that expansion of the flux generated from the end face of the pole layer 102 and the flux returning to the shield layer 103 is one of the reasons for the occurrence of wide-range adjacent track erase.

According to the magnetic head disclosed in U.S. Pat. No. 4,672,493, it is possible to increase components in the direction orthogonal to the surface of the recording medium among components of the magnetic field generated from the end of the middle magnetic layer located in the medium facing surface. Because of this, it is assumed that this magnetic head is capable of suppressing the wide-range adjacent track erase.

As previously described, the location of the end of a bit pattern to be written on the recording medium is determined by the location of an end of the end face of the pole layer located in the medium facing surface, the end being located forward along the direction of travel of the recording medium. Therefore, for a magnetic head in which magnetic layers are respectively disposed forward and backward of the pole layer along the direction of travel of the recording medium, such as the magnetic head disclosed in U.S. Pat. No. 4,672,493, it is preferred that the magnetic layer disposed forward along the direction of travel of the recording medium be capable of taking in magnetic fluxes of greater amount in the medium facing surface, compared with the magnetic layer disposed backward along the direction of travel of the recording medium.

However, in the medium facing surface of the magnetic head disclosed in U.S. Pat. No. 4,672,493, the distance between the end face of the middle magnetic layer and that of the magnetic layer located forward along the direction of travel of the recording medium is equal to the distance between the end face of the middle magnetic layer and that of the magnetic layer located backward along the direction of travel of the recording medium. It is therefore assumed that, in this magnetic head, the magnetic layer located forward along the direction of travel of the recording medium and the magnetic layer located backward along the direction of travel of the recording medium take in magnetic fluxes of nearly equal amounts. That is, the structure of this magnetic head is not such one that the magnetic layer located forward along the direction of travel of the recording medium is capable of taking in magnetic fluxes of greater amount than the magnetic layer located backward along the direction of travel of the recording medium.

In the magnetic head disclosed in U.S. Pat. No. 6,954,340 B2, in the medium facing surface, the distance between the end face of the main pole and that of the return pole located forward along the direction of travel of the recording medium is smaller than the distance between the end face of the main pole and that of the return pole located backward along the direction of travel of the recording medium. However, in this magnetic head, each of the two return poles has the end face located in the medium facing surface. As a result, in the medium facing surface of the magnetic head, magnetic fluxes of greater amount are taken in from the end face of the return pole located backward along the direction of travel of the recording medium, too.

OBJECT AND SUMMARY OF THE INVENTION

It is an object of the invention to provide a magnetic head for perpendicular magnetic recording having a structure in which an end face of a pole layer and an end face of a shield are adjacent to each other with a gap layer disposed in between in a medium facing surface, the head being capable of suppressing the wide-range adjacent track erase, suppressing protrusion of a portion of the medium facing surface due to the heat produced by the coil, and defining the location of the end of a bit pattern to be written on a recording medium, and to provide a method of manufacturing such a magnetic head.

A magnetic head for perpendicular magnetic recording of the invention comprises: a medium facing surface that faces toward a recording medium; a first coil and a second coil each generating a magnetic field corresponding to data to be written on the recording medium; a pole layer having an end face located in the medium facing surface, allowing a magnetic flux corresponding to the field generated by each of the first and second coils to pass therethrough, and generating a write magnetic field for writing the data on the recording medium by means of a perpendicular magnetic recording system; and a shield.

The shield incorporates: a first portion located backward of the pole layer along a direction of travel of the recording medium; and a second portion located forward of the pole layer along the direction of travel of the recording medium. Each of the first and second portions is connected to the pole layer at a location away from the medium facing surface. The first portion has an end face located closer to the medium facing surface, the end face being located at a distance from the medium facing surface. The second portion has an end face located in the medium facing surface. Part of the first coil passes through a space surrounded by the pole layer and the first portion. Part of the second coil passes through a space surrounded by the pole layer and the second portion.

The magnetic head of the invention further comprises: a coupling portion coupling the first and second portions to each other without touching the pole layer; and a gap layer made of a nonmagnetic material and disposed between the pole layer and the second portion. In the medium facing surface, the end face of the second portion is located forward of the end face of the pole layer along the direction of travel of the recording medium with a specific space created therebetween by a thickness of the gap layer. The end face of the pole layer has a side located adjacent to the gap layer, the side defining the track width.

In the magnetic head for perpendicular magnetic recording of the invention, the pole layer allows a magnetic flux corresponding to the magnetic field generated by the first coil and a magnetic flux corresponding to the magnetic field generated by the second coil to pass. A write magnetic field is thereby generated from the pole layer.

A method of manufacturing the magnetic head for perpendicular magnetic recording of the invention comprises the steps of: forming the first portion; forming the first coil; forming the coupling portion; forming the pole layer; forming the gap layer on the pole layer; forming the second coil; and forming the second portion on the gap layer.

In the magnetic head or the method of manufacturing the same of the invention, the thickness of the gap layer may fall within a range of 5 to 60 nm inclusive.

In the magnetic head or the method of the invention, the coupling portion may couple the first and second portions to each other on both sides of the pole layer, the sides being opposed to each other in a direction of track width.

In the magnetic head or the method of the invention, the end face of the pole layer located in the medium facing surface may have a width that decreases as the distance from the gap layer increases.

In the magnetic head or the method of the invention, the second portion may include: a yoke layer connected to the pole layer and disposed between the pole layer and the part of the second coil at a location away from the medium facing surface; and a magnetic layer connected to the yoke layer and disposed on a side of the yoke layer farther from the pole layer. In addition, the second coil may be wound around the magnetic layer when seen in the direction orthogonal to the interface between the magnetic layer and the yoke layer. In this case, the magnetic head may further comprise a nonmagnetic layer made of a nonmagnetic material and disposed between the pole layer and the yoke layer. At least a portion of the nonmagnetic layer is located in a region that coincides with at least a portion of the interface between the magnetic layer and the yoke layer when seen in the direction orthogonal to the interface. In addition, the yoke layer is connected to the pole layer at least at a location closer to the medium facing surface than the nonmagnetic layer. In this case, the method of the invention further comprises the step of forming the nonmagnetic layer on the pole layer.

In the magnetic head or the method of the invention, the first portion may include: a yoke layer connected to the pole layer and disposed between the pole layer and the part of the first coil at a location away from the medium facing surface; and a magnetic layer connected to the yoke layer and disposed on a side of the yoke layer farther from the pole layer. In addition, the first coil may be wound around the magnetic layer when seen in the direction orthogonal to the interface between the magnetic layer and the yoke layer. In this case, the magnetic head may further comprise a nonmagnetic layer made of a nonmagnetic material and disposed between the pole layer and the yoke layer. At least a portion of the nonmagnetic layer is located in a region that coincides with at least a portion of the interface between the magnetic layer and the yoke layer when seen in the direction orthogonal to the interface. In addition, the yoke layer is connected to the pole layer at least at a location closer to the medium facing surface than the nonmagnetic layer. In this case, the method of the invention further comprises the step of forming the nonmagnetic layer on the yoke layer.

In the magnetic head or the method of the invention, the second portion may incorporate a first layer touching the gap layer and a second layer connected to the first layer. In addition, the first layer may incorporate a middle portion including a portion opposed to the pole layer with the gap layer disposed in between, and two side portions located outside the middle portion along the direction of track width. In this case, the maximum length of each of the side portions taken in the direction orthogonal to the medium facing surface is greater than the length of the middle portion taken in the direction orthogonal to the medium facing surface.

The magnetic head of the invention may further comprise an encasing layer made of a nonmagnetic material, the encasing layer having a groove that opens in a top surface thereof and that accommodates at least part of the pole layer. In this case, the method of the invention further comprises the step of forming the encasing layer.

According to the magnetic head for perpendicular magnetic recording or the method of manufacturing the same of the invention, the shield incorporates: the first portion located backward of the pole layer along the direction of travel of the recording medium; and the second portion located forward of the pole layer along the direction of travel of the recording medium. According to the invention, it is thereby possible to suppress the wide-range adjacent track erase.

According to the invention, the magnetic flux corresponding to the magnetic field generated by each of the first and second coils passes through the pole layer. As a result, it is possible to make the number of turns of each of the first and second coils smaller than that of a single coil of a magnetic head in which the coil is the only one coil provided. According to the invention, it is thus possible to reduce the resistance of each of the first and second coils so as to reduce the heat value of each of the coils. As a result, it is possible to suppress protrusion of a portion of the medium facing surface 30 due to the heat generated by the first and second coils.

According to the invention, the first portion of the shield has the end face located closer to the medium facing surface, and this end face is located at a distance from the medium facing surface 30. In addition, the second portion of the shield has the end face located in the medium facing surface. This end face of the second portion is located forward of the end face of the pole layer along the direction of travel of the recording medium with a specific space created by the gap layer. As a result, at a location forward of the end face of the pole layer along the direction of travel of the recording medium, it is possible to effectively take in a magnetic flux generated from the end face of the pole layer and extending in directions except the direction orthogonal to the surface of the recording medium so as to prevent the flux from reaching the recording medium. Furthermore, according to the invention, the first portion and the second portion are coupled to each other by the coupling portion. As a result, it is possible to take in magnetic fluxes of greater amount from the end face of the second portion. Because of these features of the invention, it is possible to precisely define the location of the end of a bit pattern to be written on the recording medium.

Other and further objects, features and advantages of the invention will appear more fully from the following description.

BRIEF DESCRIPTION OF THE DRAWINGS

FIG. 13A to FIG. 13C are views for illustrating a step that follows the step shown in FIG. 12A to FIG. 12C.

DETAILED DESCRIPTION OF THE PREFERRED EMBODIMENTS

[First Embodiment]

Figure 1:
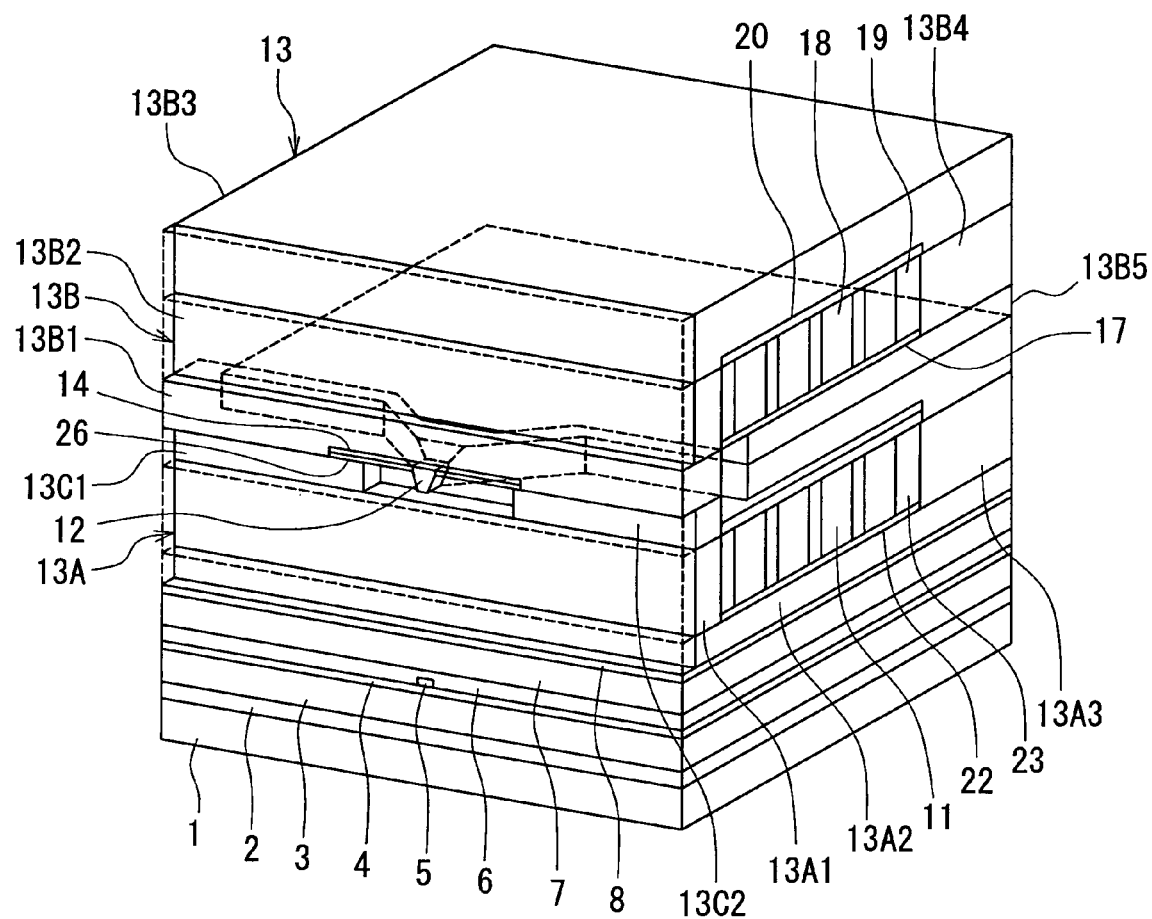
FIG. 1 is a perspective view illustrating a portion of a magnetic head of a first embodiment of the invention in a neighborhood of the medium facing surface.
Figure 2:
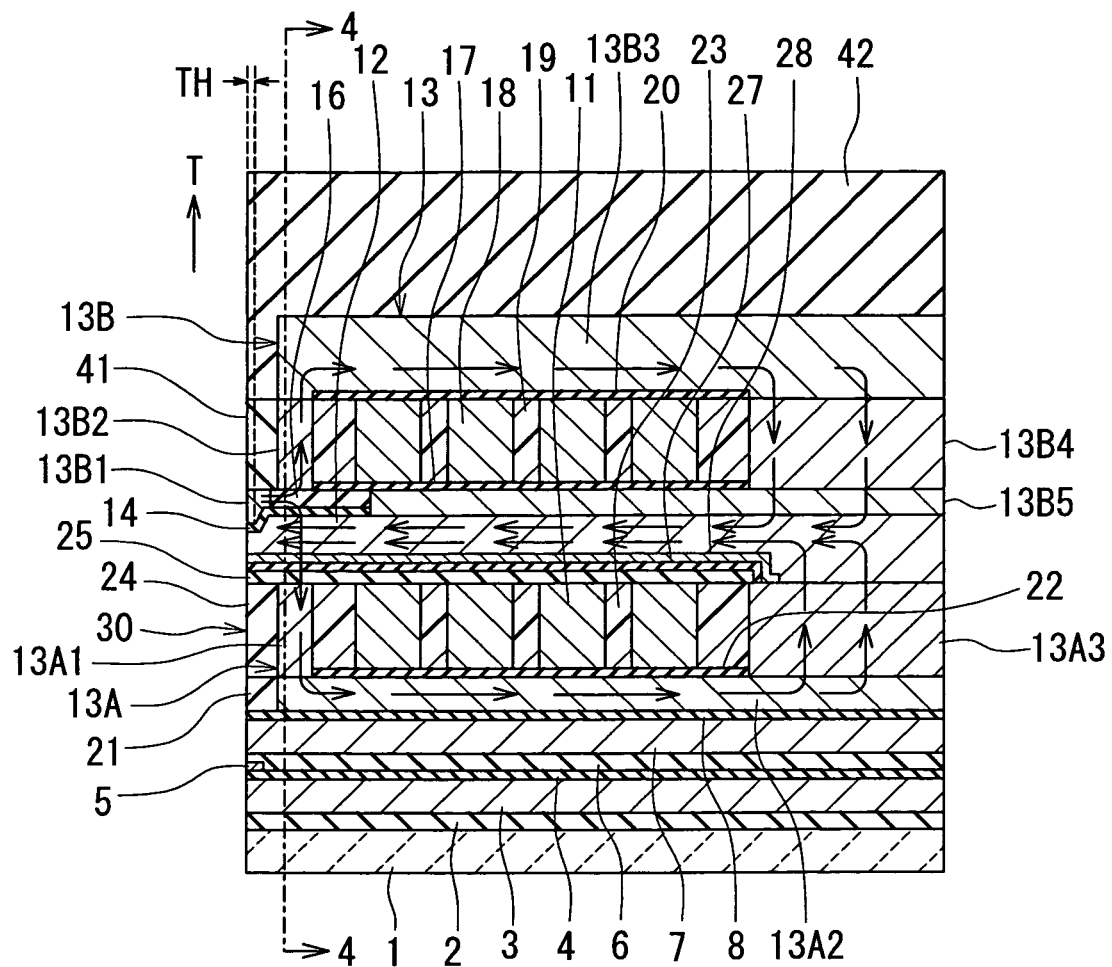
FIG. 2 is a cross-sectional view for illustrating the configuration of the magnetic head of the first embodiment of the invention.
Figure 3:
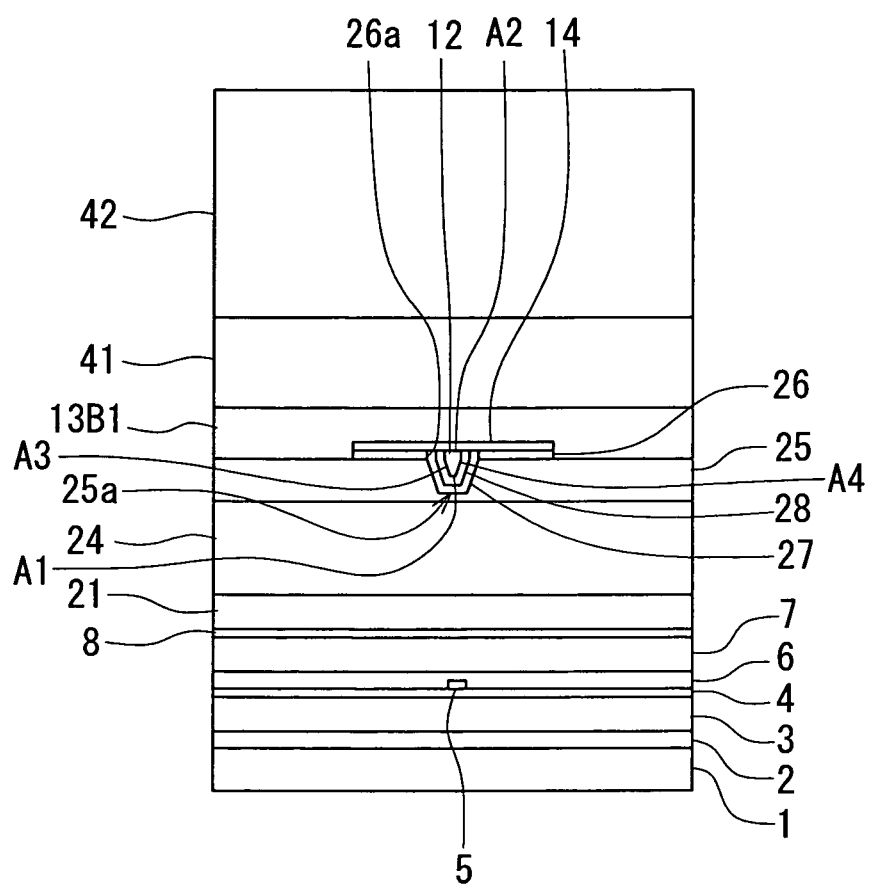
FIG. 3 is a front view of the medium facing surface of the magnetic head of the first embodiment of the invention.
Figure 4:
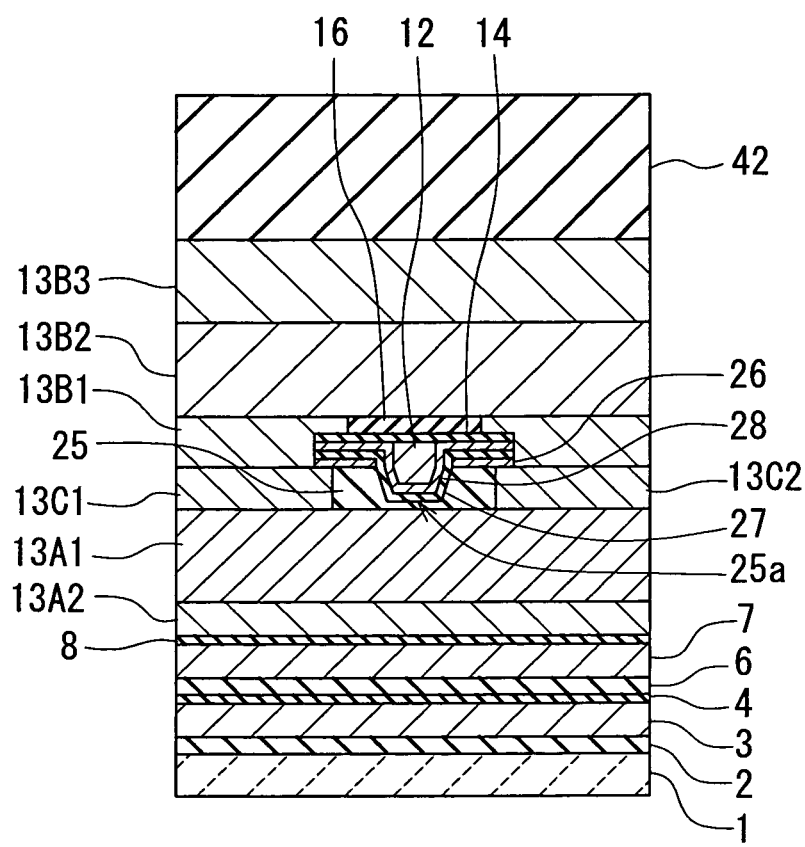
FIG. 4 is a cross-sectional view taken along line 4-4 of FIG. 2.
Figure 5:
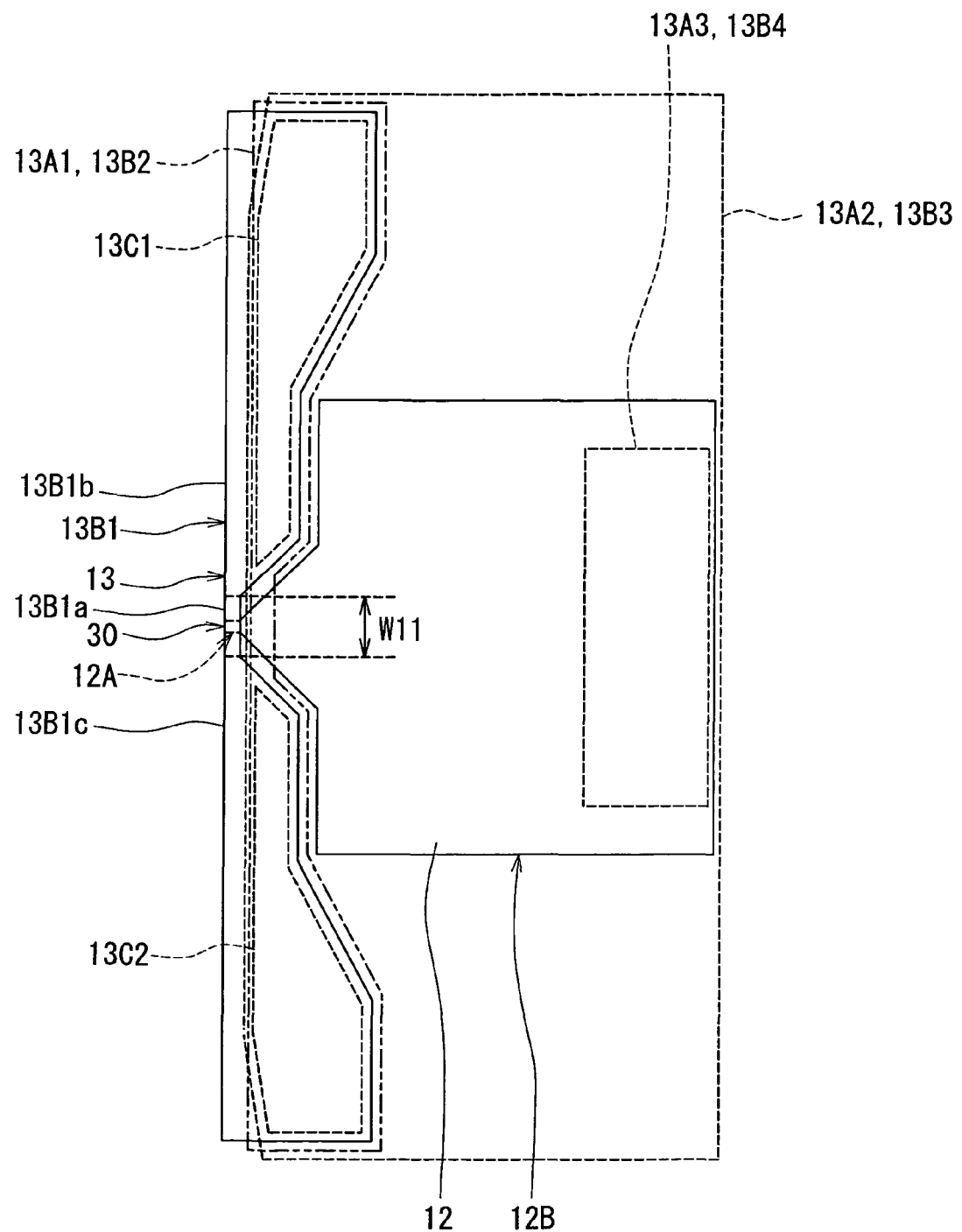
FIG. 5 is a top view for illustrating the pole layer and the shield of the magnetic head of the first embodiment of the invention.

Preferred embodiments of the invention will now be described in detail with reference to the accompanying drawings. Reference is now made to FIG. 1 to FIG. 5 to describe the configuration of a magnetic head for perpendicular magnetic recording of a first embodiment of the invention. FIG. 1 is a perspective view illustrating a portion of the magnetic head of the first embodiment in a neighborhood of the medium facing surface. FIG. 2 is a cross-sectional view for illustrating the configuration of the magnetic head of the embodiment. FIG. 2 illustrates a cross section orthogonal to the medium facing surface and the plane of a substrate. The arrow indicated with T in FIG. 2 shows the direction of travel of a recording medium. FIG. 3 is a front view of the medium facing surface of the magnetic head of the embodiment. FIG. 4 is a cross-sectional view taken along line 4-4 of FIG. 2. FIG. 5 is a top view for illustrating a pole layer and a shield of the magnetic head of the embodiment.

As shown in FIG. 2 to FIG. 4, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 made of a magnetic material and disposed on the top shield gap film 6.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The portions from the bottom shield layer 3 to the top shield layer 7 make up a read head. The magnetic head further comprises a nonmagnetic layer 8 made of a nonmagnetic material and disposed on the top shield layer 7, and a write head disposed on the nonmagnetic layer 8. The nonmagnetic layer 8 is made of alumina, for example. The write head comprises a first coil 11, a second coil 18, a pole layer 12, a shield 13 and a gap layer 14.

The first coil 11 and the second coil 18 each generate a magnetic field corresponding to data to be written on the recording medium. The pole layer 12 has an end face located in the medium facing surface 30. The pole layer 12 allows a magnetic flux corresponding to the field generated by each of the coils 11 and 18 to pass therethrough and generates a write magnetic field for writing the data on the medium by means of the perpendicular magnetic recording system.

The shield 13 incorporates: a first portion 13A located backward of the pole layer 12 along the direction T of travel of the recording medium; a second portion 13B located forward of the pole layer 12 along the direction T of travel of the recording medium; and coupling portions 13C1 and 13C2. Each of the first portion 13A, the second portion 13B, and the coupling portions 13C1 and 13C2 is made of a magnetic material. The material may be any of CoFeN, CoNiFe, NiFe and CoFe, for example.

The first portion 13A has a first layer 13A1, a second layer 13A2 and a third layer 13A3. The second layer 13A2 is disposed on the nonmagnetic layer 8. The second layer 13A2 has an end face closer to the medium facing surface 30. This end face is located at a distance from the medium facing surface 30. The magnetic head further comprises: an insulating layer 21 made of an insulating material and disposed around the second layer 13A2 on the nonmagnetic layer 8; and an insulating layer 22 made of an insulating material and disposed on a portion of the top surface of the second layer 13A2. The insulating layers 21 and 22 are made of alumina, for example. The first coil 11 is disposed on the insulating layer 22. The coil 11 is flat-whorl-shaped.

The first layer 13A1 and the third layer 13A3 are disposed on the second layer 13A2 and connected to the second layer 13A2. The first layer 13A1 is disposed between the medium facing surface 30 and the coil 11. The third layer 13A3 is located farther from the medium facing surface 30 than the first layer 13A1. The coil 11 is wound around the third layer 13A3.

The magnetic head further comprises: an insulating layer 23 made of an insulating material and disposed around the coil 11 and in the space between the respective adjacent turns of the coil 11; and an insulating layer 24 disposed around the insulating layer 23, the first layer 13A1 and the third layer 13A3. The first layer 13A1, the third layer 13A3, the coil 11, and the insulating layers 23 and 24 have flattened top surfaces. The insulating layer 23 is made of photoresist, for example. The insulating layer 24 is made of alumina, for example. The coil 11 is made of a conductive material such as copper.

The magnetic head further comprises an encasing layer 25 made of a nonmagnetic material and disposed on the flattened top surfaces of the first layer 13A1, the third layer 13A3, the coil 11, and the insulating layers 23 and 24. The encasing layer 25 has a groove 25a that opens in the top surface thereof and that accommodates at least part of the pole layer 12. The bottom of the groove 25a has a contact hole formed to a level of the top surface of the third layer 13A3. The encasing layer 25 may be made of an insulating material such as alumina, silicon oxide ($SiO_x$) or silicon oxynitride (SiON), or a nonmagnetic metal material such as Ru, Ta, Mo, Ti, W, NiCu, NiB or NiP.

The magnetic head further comprises a nonmagnetic metal layer 26 made of a nonmagnetic metal material and disposed on the top surface of the encasing layer 25. The nonmagnetic metal layer 26 has an opening 26a that penetrates, and the edge of the opening 26a is located directly above the edge of the groove 25a in the top surface of the encasing layer 25. The nonmagnetic metal layer 26 may be made of any of Ta, Mo, W, Ti, Ru, Rh, Re, Pt, Pd, Ir, NiCr, NiP, NiB, AlCu, $WSi_2$, $TaSi_2$, $TiSi_2$, TiN, and TiW, for example.

The magnetic head further comprises a nonmagnetic film 27 and a polishing stopper layer 28 that are disposed in the groove 25a of the encasing layer 25 and in the opening 26a of the nonmagnetic metal layer 26. The nonmagnetic film 27 is disposed to touch the surface of the groove 25a. The pole layer 12 is disposed apart from the surface of the groove 25a. The polishing stopper layer 28 is disposed between the nonmagnetic film 27 and the pole layer 12. The polishing stopper layer 28 also functions as an electrode layer (a seed layer) used for forming the pole layer 12 by plating. The nonmagnetic film 27 and the polishing stopper layer 28 have contact holes, too, that are formed to the level of the top surface of the third layer 13A3. The pole layer 12 is thus connected to the third layer 13A3 through the contact holes formed in the groove 25a, the nonmagnetic film 27 and the polishing stopper layer 28.

The nonmagnetic film 27 is made of a nonmagnetic material. The material of the nonmagnetic film 27 may be an insulating material, a semiconductor material or a conductive material. The insulating material as the material of the nonmagnetic film 27 may be any of alumina, silicon oxide ($SiO_x$), and silicon oxynitride (SiON). The semiconductor material as the material of the nonmagnetic film 27 may be polycrystalline silicon or amorphous silicon. The conductive material as the material of the nonmagnetic film 27 may be the same as that of the nonmagnetic metal layer 26.

The polishing stopper layer 28 is made of a nonmagnetic material. The material of the polishing stopper layer 28 may be a nonmagnetic conductive material or an insulating material. The nonmagnetic conductive material as the material of the polishing stopper layer 28 may be the same as that of the nonmagnetic metal layer 26. The insulating material as the material of the polishing stopper layer 28 may be silicon oxide.

The pole layer 12 is made of a magnetic metal material. The pole layer 12 may be made of any of NiFe, CoNiFe and CoFe, for example.

The gap layer 14 is disposed on a region of the pole layer 12 near the medium facing surface 30. The gap layer 14 is made of a nonmagnetic material. The material of the gap layer 14 may be an insulating material such as alumina or a nonmagnetic conductive material such as Ru, NiCu, Ta, W, NiB or NiP.

As shown in FIG. 4, the coupling portions 13C1 and 13C2 are disposed on the first layer 13A1 of the first portion 13A and connected to the first layer 13A1. The coupling portions 13C1 and 13C2 are disposed on both sides of the pole layer 12 opposed to each other in the direction of track width.

The second portion 13B of the shield 13 has a first layer 13B1, a second layer 13B2, a third layer 13B3, a fourth layer 13B4 and an upper yoke layer 13B5. The first layer 13B1 is disposed on the gap layer 14. The first layer 13B1 has an end face located in the medium facing surface 30. In the medium facing surface 30 the end face of the first layer 13B1 is located at a specific distance created by the thickness of the gap layer 14 from the end face of the pole layer 12. The thickness of the gap layer 14 preferably falls within a range of 5 to 60 nm inclusive, and may fall within a range of 30 to 60 nm inclusive, for example. The end face of the pole layer 12 has a side adjacent to the gap layer 14, and this side defines the track width.

As shown in FIG. 5, the first layer 13B1 incorporates: a middle portion 13B1a including a portion opposed to the pole layer 12 with the gap layer 14 disposed in between; and two side portions 13B1b and 13B1c located outside the middle portion 13B1a along the direction of track width. The length of the middle portion 13B1a taken in the direction orthogonal to the medium facing surface 30 is uniform, regardless of the location along the direction of track width. The length of the middle portion 13B1a taken in the direction orthogonal to the medium facing surface 30 falls within a range of 0.1 to 0.4 µm inclusive, for example. The width W11 of the middle portion 13B1a is equal to or greater than the track width. The width W11 of the middle portion 13B1a falls within a range of 0.2 to 3.0 µm inclusive, for example. The maximum length of each of the side portions 13B1b and 13B1c taken in the direction orthogonal to the medium facing surface 30 is greater than the length of the middle portion 13B1a taken in the direction orthogonal to the medium facing surface 30. The maximum length of each of the side portions 13B1b and 13B1c falls within a range of 0.3 to 5.0 µm inclusive, for example. The coupling portions 13C1 and 13C2 are connected to the side portions 13B1b and 13B1c, respectively.

The upper yoke layer 13B5 is disposed on a region of the pole layer 12 away from the medium facing surface 30 and connected to the pole layer 12. The magnetic head further comprises a nonmagnetic layer 16 made of a nonmagnetic material and disposed around the first layer 13B1 and the upper yoke layer 13B5. The nonmagnetic layer 16 is made of alumina, for example. The first layer 13B1, the upper yoke layer 13B5 and the nonmagnetic layer 16 have flattened top surfaces.

The magnetic head further comprises an insulating layer 17 made of an insulating material and disposed on portions of the flattened top surfaces of the upper yoke layer 13B5 and the nonmagnetic layer 16. The insulating layer 17 is made of alumina, for example. The second coil 18 is disposed on the insulating layer 17. The coil 18 is flat-whorl-shaped.

The second layer 13B2 is disposed on the first layer 13B1 and connected to the first layer 13B1. The second layer 13B2 has an end face located closer to the medium facing surface 30. This end face is located at a distance from the medium facing surface 30. The second layer 13B2 does not touch the middle portion 13B1a of the first layer 13B1 but touches the side portions 13B1b and 13B1c.

The fourth layer 13B4 is disposed on a region of the upper yoke layer 13B5 away from the medium facing surface 30 and connected to the upper yoke layer 13B5. The coil 18 is wound around the fourth layer 13B4.

The magnetic head further comprises: an insulating layer 19 made of an insulating material and disposed around the coil 18 and in the space between the respective adjacent turns of the coil 18; and an insulating layer 41 made of an insulating material and disposed around the insulating layer 19, the second layer 13B2 and the fourth layer 13B4. The second layer 13B2, the fourth layer 13B4, the coil 18, and the insulating layers 19 and 41 have flattened top surfaces. The magnetic head further comprises an insulating layer 20 disposed to cover the coil 18 and the insulating layer 19. The insulating layer 19 is made of photoresist, for example. The insulating layers 20 and 41 are made of alumina, for example. The coil 18 is made of a conductive material such as copper.

The third layer 13B3 is disposed to couple the second layer 13B2 to the fourth layer 13B4. The third layer 13B3 has an end face located closer to the medium facing surface 30. This end face is located at a distance from the medium facing surface 30.

The magnetic head further comprises a protection layer 42 made of a nonmagnetic material and disposed to cover the second portion 13B. The protection layer 42 is made of an inorganic insulating material such as alumina.

As described so far, the magnetic head of the embodiment comprises the medium facing surface 30 that faces toward a recording medium, the read head, and the write head. The read head and the write head are stacked on the substrate 1. The read head is located backward along the direction T of travel of the recording medium (that is, located closer to the air inflow end of the slider). The write head is located forward along the direction T of travel of the recording medium (that is, located closer to the air outflow end of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the first coil 11, the second coil 18, the pole layer 12, the shield 13 and the gap layer 14.

The pole layer 12 is disposed in the groove 25a of the encasing layer 25 and in the opening 26a of the nonmagnetic metal layer 26 with the nonmagnetic film 27 and the polishing stopper layer 28 disposed between the pole layer 12 and each of the groove 25a and the opening 26a. The nonmagnetic film 27 has a thickness that falls within a range of 10 to 40 nm inclusive, for example. However, the thickness of the nonmagnetic film 27 is not limited to this range but may be of any other value, depending on the track width. The polishing stopper layer 28 has a thickness that falls within a range of 30 to 100 nm inclusive, for example.

The pole layer 12 incorporates: a first portion having the end face located in the medium facing surface 30; and a second portion having a thickness greater than that of the first portion and disposed farther from the medium facing surface 30 than the first portion. The thickness of the first portion does not change according to the distance from the medium facing surface 30. The top surface of the first portion is located closer to the substrate 1 than the top surface of the second portion. As a result, the top surface of the pole layer 12 that touches the gap layer 14 bends. The gap layer 14 bends along the top surface of the pole layer 12. The difference in level between the top surfaces of the first portion and the second portion falls within a range of 0.1 to 0.3 µm inclusive, for example. The thickness of the first portion falls within a range of 0.03 to 0.3 µm inclusive, for example.

The shield 13 incorporates: the first portion 13A located backward of the pole layer 12 along the direction T of travel of the recording medium; the second portion 13B located forward of the pole layer 12 along the direction T of travel of the recording medium; and the coupling portions 13C1 and 13C2. Each of the first portion 13A and the second portion 13B is connected to the pole layer 12 at a location away from the medium facing surface 30. The second portion 13B has the end face located in the medium facing surface 30. Part of the first coil 11 passes through a space surrounded by the pole layer 12 and the first portion 13A. Part of the second coil 18 passes through a space surrounded by the pole layer 12 and the second portion 13B.

The coupling portions 13C1 and 13C2 couple the first portion 13A and the second portion 13B to each other at a location closer to the medium facing surface 30 than a portion of each of the first coil 11 and the second coil 18 without touching the pole layer 12. To be specific, as shown in FIG. 4, the coupling portions 13C1 and 13C2 are disposed on both sides of the pole layer 12 opposed to each other in the direction of track width, and couple the first layer 13A1 of the first portion 13A and the first layer 13B1 of the second portion 13B to each other.

Each of the first layer 13A1 and the third layer 13A3 has a thickness that falls within a range of 0.8 to 3.0 µm inclusive, for example. The second layer 13A2 has a thickness that falls within a range of 0.5 to 1.5 µm inclusive, for example. Each of the first layer 13B1 and the upper yoke layer 13B5 has a thickness that falls within a range of 0.3 to 0.8 µm inclusive, for example. Each of the second layer 13B2 and the fourth layer 13B4 has a thickness that falls within a range of 0.8 to 3.0 µm inclusive, for example. The third layer 13B3 has a thickness that falls within a range of 2.0 to 3.0 µm inclusive, for example. Each of the coupling portions 13C1 and 13C2 has a thickness that falls within a range of 0.2 to 0.5 µm inclusive, for example.

Each of the first layer 13A1 and the second layer 13A2 of the first portion 13A, the second layer 13B2 and the third layer 13B3 of the second portion 13B, and the coupling portions 13C1 and 13C2 has an end face located closer to the medium facing surface 30, the end face being located at a distance from the medium facing surface 30. The distance between the medium facing surface 30 and each of these end faces is 0.1 to 1.0 µm, for example.

In the medium facing surface 30, the end face of the second portion 13B, that is, the end face of the first layer 13B1 is located at a specific distance created by the thickness of the gap layer 14 from the end face of the pole layer 12. The end face of the pole layer 12 has a side adjacent to the gap layer 14, and this side defines the track width.

Reference is now made to FIG. 3 and FIG. 5 to describe the shape of the pole layer 12 in detail. As shown in FIG. 5, the pole layer 12 incorporates a track width defining portion 12A and a wide portion 12B. The track width defining portion 12A has the end face located in the medium facing surface 30. The wide portion 12B is located farther from the medium facing surface 30 than the track width defining portion 12A and has a width greater than the width of the track width defining portion 12A. The width of the track width defining portion 12A does not change in accordance with the distance from the medium facing surface 30. The wide portion 12B is equal in width to the track width defining portion 12A at the boundary with the track width defining portion 12A, and gradually increases in width as the distance from the medium facing surface 30 increases and then maintains a specific width to the end of the wide portion 12B. In the embodiment the track width defining portion 12A is a portion of the pole layer 12 extending from the end face located in the medium facing surface 30 to the point at which the width of the pole layer 12 starts to increase. Here, the length of the track width defining portion 12A taken in the direction orthogonal to the medium facing surface 30 is called a neck height. The neck height falls within a range of 0.05 to 0.3 µm inclusive, for example.

As shown in FIG. 3, the end face of the pole layer 12 located in the medium facing surface 30 has: a first side A1 closest to the substrate 1; a second side A2 adjacent to the gap layer 14; a third side A3 connecting an end of the first side A1 to an end of the second side A2; and a fourth side A4 connecting the other end of the first side A1 to the other end of the second side A2. The second side A2 defines the track width. The width of the end face of the pole layer 12 located in the medium facing surface 30 decreases as the distance from the gap layer 14 increases. Each of the third side A3 and the fourth side A4 forms an angle that falls within a range of 5 to 15 degrees inclusive, for example, with respect to the direction orthogonal to the top surface of the substrate 1. The length of the second side A2, that is, the track width, falls within a range of 0.05 to 0.20 µm inclusive, for example.

In the embodiment the throat height TH is the distance between the medium facing surface 30 and one of two points that is closer to the medium facing surface 30, wherein one of the two points is the one at which the space between the pole layer 12 and the second portion 13B of the shield 13 starts to increase when seen from the medium facing surface 30, and the other of the points is the one at which the gap layer 14 first bends when seen from the medium facing surface 30. In the embodiment the throat height TH is the distance between the medium facing surface 30 and the point at which the gap layer 14 first bends when seen from the medium facing surface 30. The throat height TH falls within a range of 0.05 to 0.3 μm inclusive, for example.

Reference is now made to FIG. 6A to FIG. 17A, FIG. 6B to FIG. 17B, and FIG. 6C to FIG. 17C to describe a method of manufacturing the magnetic head of the embodiment. FIG. 6A to FIG. 17A, FIG. 6B to FIG. 17B, and FIG. 6C to FIG. 17C illustrate layered structures obtained in manufacturing process of the magnetic head. The portions closer to the substrate 1 than the top shield layer 7 are omitted in FIG. 6A to FIG. 17A, FIG. 6B to FIG. 17B, and FIG. 6C to FIG. 17C. According to the method of manufacturing the magnetic head of the embodiment, as shown in FIG. 2 to FIG. 4, the insulating layer 2, the bottom shield layer 3 and the bottom shield gap film 4 are first formed one by one on the substrate 1. Next, the MR element 5 and leads (not shown) connected to the MR element 5 are formed on the bottom shield gap film 4. Next, the top shield gap film 6 is formed to cover the MR element 5 and the leads. Next, the top shield layer 7 is formed on the top shield gap film 6.

Figure 6A:
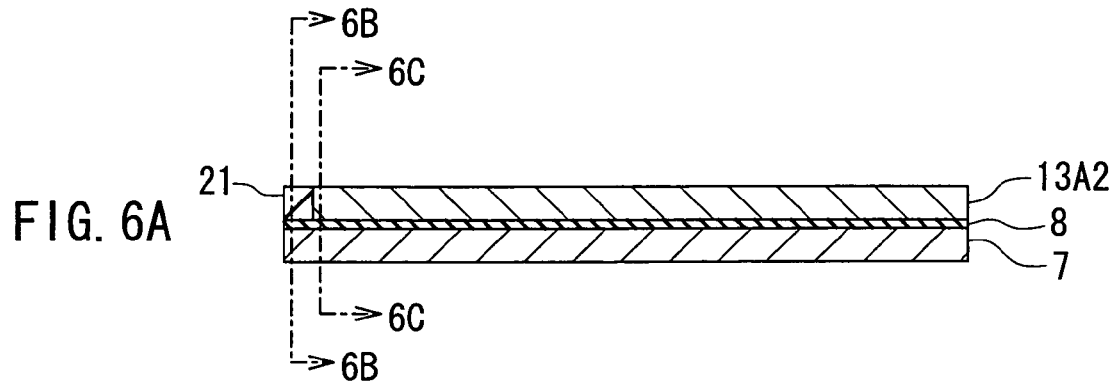
FIG. 6A to FIG. 6C are views for illustrating a step of a method of manufacturing the magnetic head of the first embodiment of the invention.
Figure 6B:
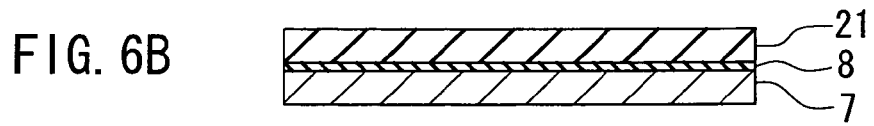
Figure 6C:
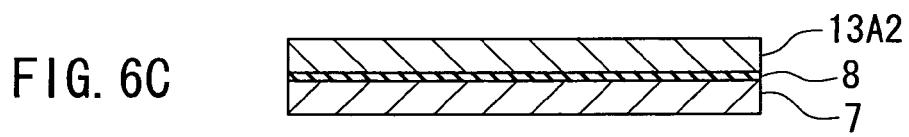

FIG. 6A to FIG. 6C illustrate the following step. FIG. 6A shows a cross section of a layered structure obtained in the manufacturing process of the magnetic head, the cross section being orthogonal to the medium facing surface and the substrate. FIG. 6B shows a cross section of the layered structure taken along line 6B-6B of FIG. 6A. FIG. 6C shows a cross section of the layered structure taken along line 6C-6C of FIG. 6A.

In the step, first, the nonmagnetic layer 8 is formed on the top shield layer 7 by sputtering, for example. Next, the second layer 13A2 of the first portion 13A of the shield 13 is formed on the nonmagnetic layer 8 by flame plating, for example. Next, the insulating layer 21 is formed on the entire top surface of the layered structure. The insulating layer 21 is then polished by chemical mechanical polishing (hereinafter referred to as CMP), for example, so that the second layer 13A2 is exposed.

Figure 7A:
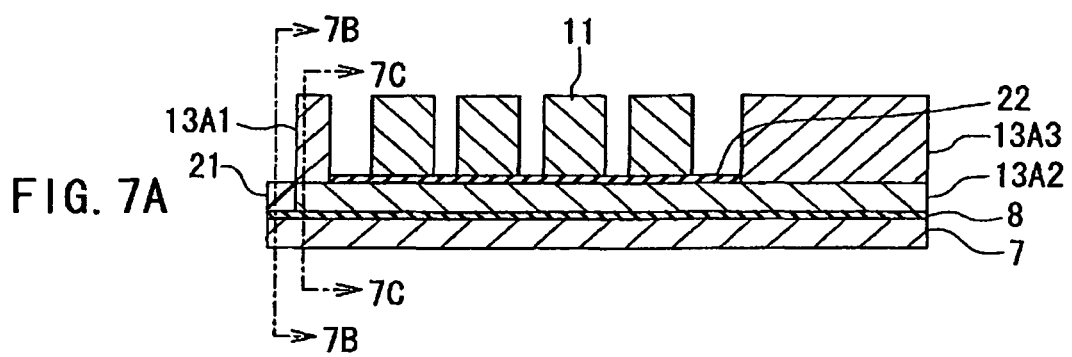
FIG. 7A to FIG. 7C are views for illustrating a step that follows the step shown in FIG. 6A to FIG. 6C.
Figure 7B:
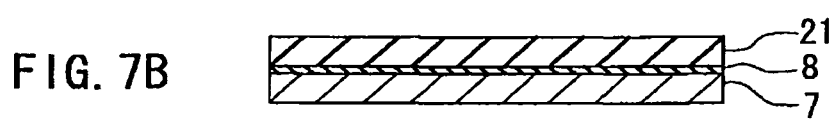
Figure 7C:
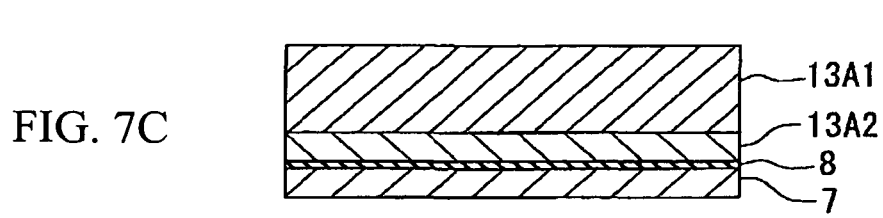

FIG. 7A to FIG. 7C illustrate the following step. FIG. 7A shows a cross section of a layered structure obtained in the manufacturing process of the magnetic head, the cross section being orthogonal to the medium facing surface and the substrate. FIG. 7B shows a cross section of the layered structure taken along line 7B-7B of FIG. 7A. FIG. 7C shows a cross section of the layered structure taken along line 7C-7C of FIG. 7A.

In the step, first, the insulating layer 22 is formed on regions of the top surfaces of the second layer 13A2 and the insulating layer 21 where the coil 11 is to be disposed. Next, the coil 11 is formed on the insulating layer 22 by frame plating, for example. Next, the first layer 13A1 and the third layer 13A3 of the first portion 13A are formed by frame plating, for example. Alternatively, the coil 11 may be formed after the first layer 13A1 and the third layer 13A3 are formed.

Figure 8A:
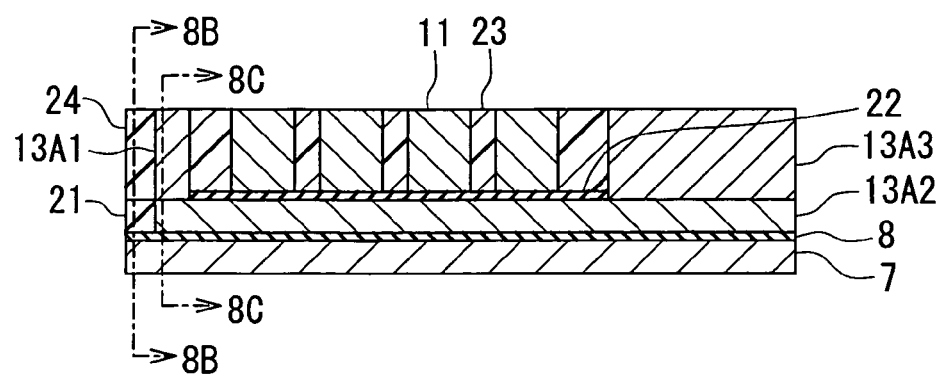
FIG. 8A to FIG. 8C are views for illustrating a step that follows the step shown in FIG. 7A to FIG. 7C.
Figure 8B:
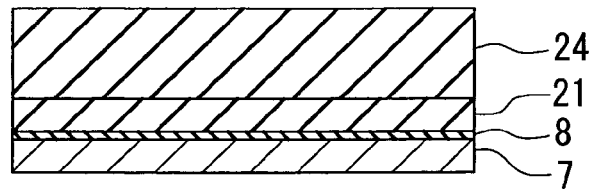
Figure 8C:
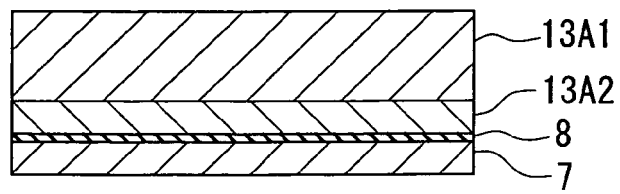

FIG. 8A to FIG. 8C illustrate the following step. FIG. 8A shows a cross section of a layered structure obtained in the manufacturing process of the magnetic head, the cross section being orthogonal to the medium facing surface and the substrate. FIG. 8B shows a cross section of the layered structure taken along line 8B-8B of FIG. 8A. FIG. 8C shows a cross section of the layered structure taken along line 8C-8C of FIG. 8A.

In the step, first, the insulating layer 23 made of photoresist, for example, is selectively formed around the coil 11 and in the space between the respective adjacent turns of the coil 11. Next, the insulating layer 24 having a thickness of 3 to 4 μm, for example, is formed by a method such as sputtering on the entire top surface of the layered structure. Next, the insulating layer 24 is polished by CMP, for example, so that the first layer 13A1, the third layer 13A3, and the coil 11 are exposed, and the top surfaces of the first layer 13A1, the third layer 13A3, the coil 11, and the insulating layers 23 and 24 are thereby flattened.

Figure 9A:
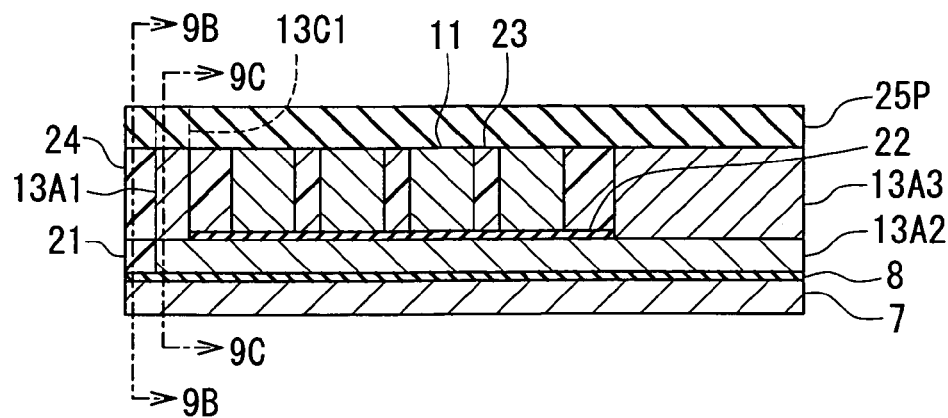
FIG. 9A to FIG. 9C are views for illustrating a step that follows the step shown in FIG. 8A to FIG. 8C.
Figure 9B:
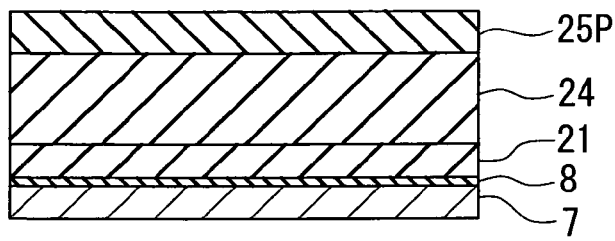
Figure 9C:
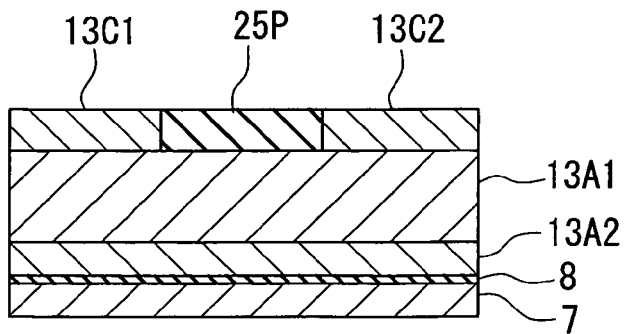

FIG. 9A to FIG. 9C illustrate the following step. FIG. 9A shows a cross section of a layered structure obtained in the manufacturing process of the magnetic head, the cross section being orthogonal to the medium facing surface and the substrate. FIG. 9B shows a cross section of the layered structure taken along line 9B-9B of FIG. 9A. FIG. 9C shows a cross section of the layered structure taken along line 9C-9C of FIG. 9A.

In the step, first, the coupling portions 13C1 and 13C2 are formed on the first layer 13A1 by frame plating, for example. Next, a nonmagnetic layer 25P is formed by sputtering, for example, on the entire top surface of the layered structure. The groove 25a will be formed in the nonmagnetic layer 25P later and the nonmagnetic layer 25P will be thereby formed into the encasing layer 25. Next, the nonmagnetic layer 25P is polished by CMP, for example, so that the coupling portions 13C1 and 13C2 are exposed, and the top surfaces of the coupling portions 13C1 and 13C2 and the nonmagnetic layer 25P are thereby flattened.

Figure 10A:
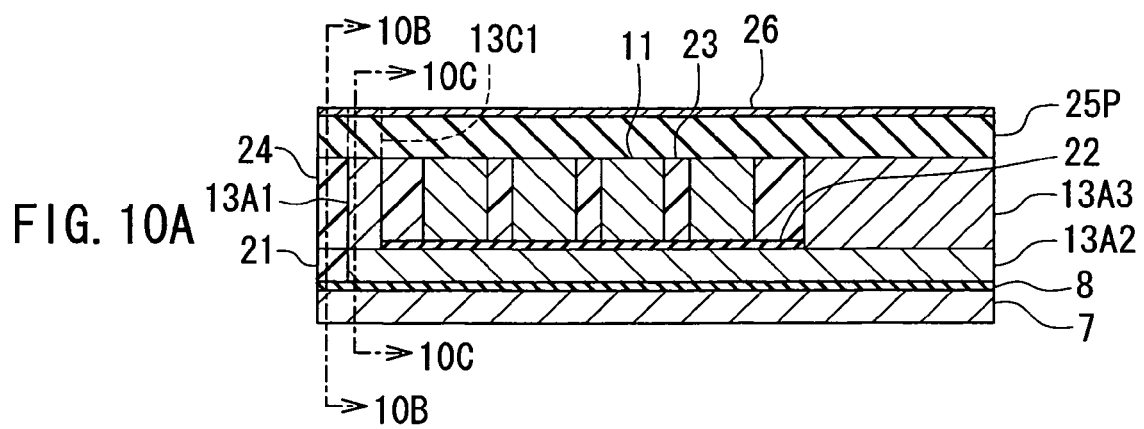
FIG. 10A to FIG. 10C are views for illustrating a step that follows the step shown in FIG. 9A to FIG. 9C.
Figure 10B:
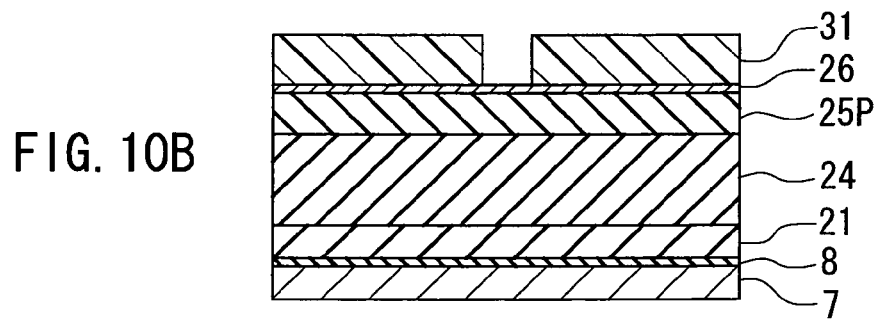
Figure 10C:
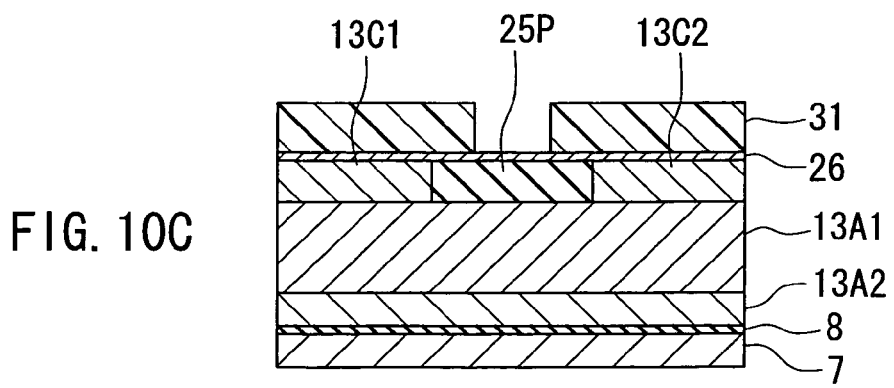

FIG. 10A to FIG. 10C illustrate the following step. FIG. 10A shows a cross section of a layered structure obtained in the manufacturing process of the magnetic head, the cross section being orthogonal to the medium facing surface and the substrate. FIG. 10B shows a cross section of the layered structure taken along line 10B-10B of FIG. 10A. FIG. 10C shows a cross section of the layered structure taken along line 10C-10C of FIG. 10A.

In the step, first, the nonmagnetic metal layer 26 is formed by sputtering, for example, on the coupling portions 13C1 and 13C2 and the nonmagnetic layer 25P. The nonmagnetic metal layer 26 has a thickness that falls within a range of 40 to 100 nm inclusive, for example. Next, a photoresist layer having a thickness of 1.0 μm, for example, is formed on the nonmagnetic metal layer 26. The photoresist layer is then patterned to form a mask 31 for making the groove 25a of the encasing layer 25. The mask 31 has an opening having a shape corresponding to the groove 25a.

Figure 11A:
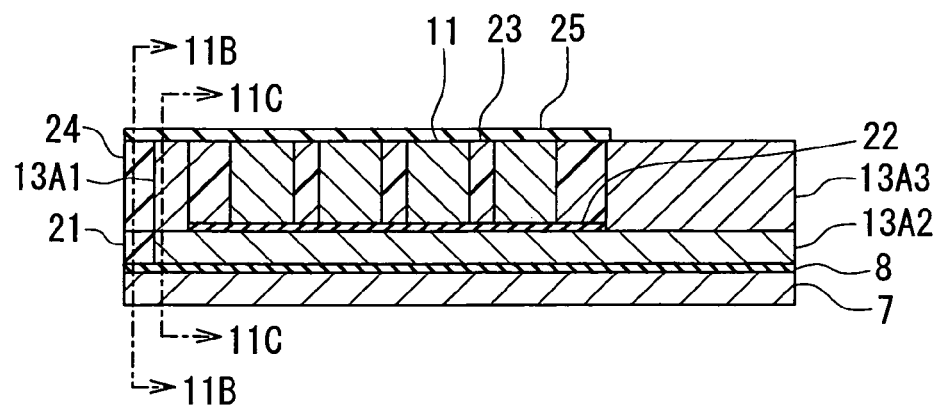
FIG. 11A to FIG. 11C are views for illustrating a step that follows the step shown in FIG. 10A to FIG. 1C.
Figure 11B:
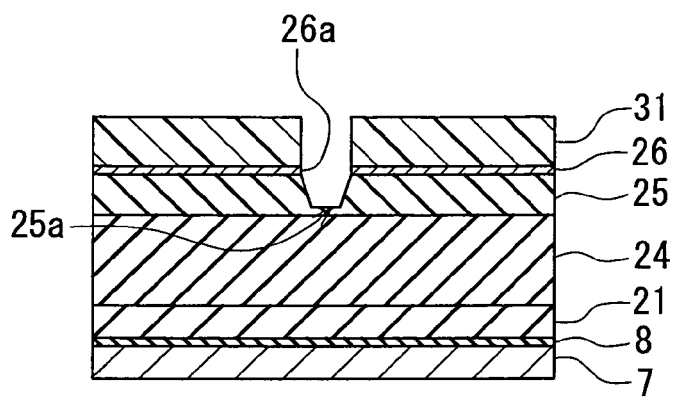
Figure 11C:
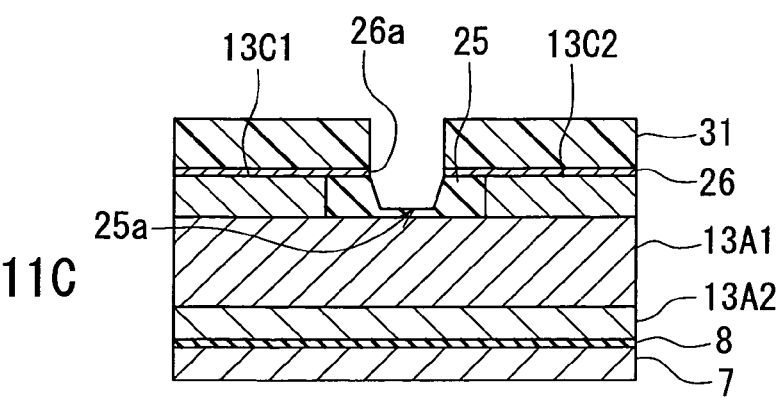

FIG. 1A to FIG. 11c illustrate the following step. FIG. 1A shows a cross section of a layered structure obtained in the manufacturing process of the magnetic head, the cross section being orthogonal to the medium facing surface and the substrate. FIG. 11B shows a cross section of the layered structure taken along line 11B-11B of FIG. 11A. FIG. 11c shows a cross section of the layered structure taken along line 11C-11C of FIG. 11A.

In the step, first, the nonmagnetic metal layer 26 is selectively etched using the mask 31. The opening 26a that penetrates is thereby formed in the nonmagnetic metal layer 26. The opening 26a has a shape corresponding to the plane geometry of the pole layer 12 to be formed later. Furthermore, a portion of the nonmagnetic layer 25P exposed from the opening 26a of the nonmagnetic metal layer 26 is selectively etched so as to form the groove 25a in the nonmagnetic layer 25P. Furthermore, a portion of the nonmagnetic layer 25P located on the third layer 13A3 is selectively etched so as to form a contact hole at the bottom of the groove 25a. The mask 31 is then removed. The nonmagnetic layer 25P is formed into the encasing layer 25 by being provided with the groove 25a. The edge of the opening 26a of the nonmagnetic metal layer 26 is located directly above the edge of the groove 25a located in the top surface of the encasing layer 25.

The etching of the nonmagnetic metal layer 26 and the nonmagnetic layer 25P is performed by reactive ion etching or ion beam etching, for example. The etching for forming the groove 25a in the nonmagnetic layer 25P is performed such that the walls of the groove 25a corresponding to both sides of the track width defining portion 12A of the pole layer 12 each form an angle that falls within a range of 5 to 15 degrees inclusive, for example, with respect to the direction orthogonal to the top surface of the substrate 1.

Figure 12A:
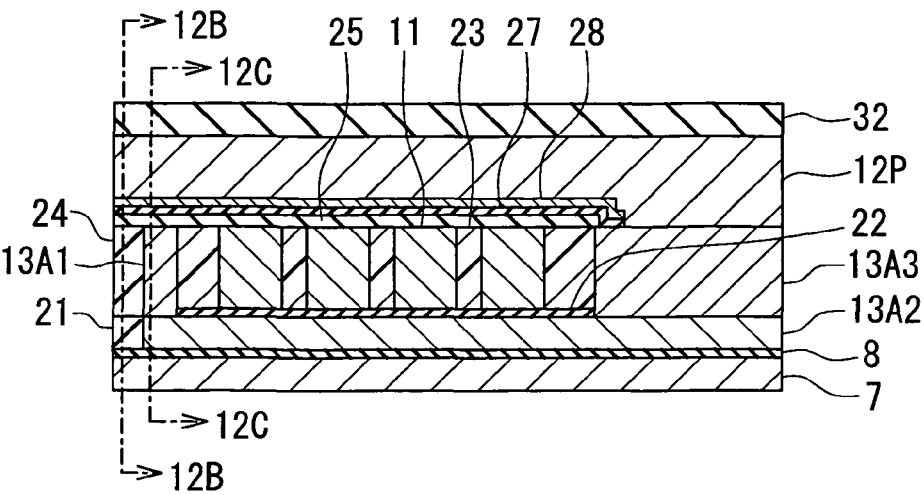
FIG. 12A to FIG. 12C are views for illustrating a step that follows the step shown in FIG. 11A to FIG. 11C.
Figure 12B:
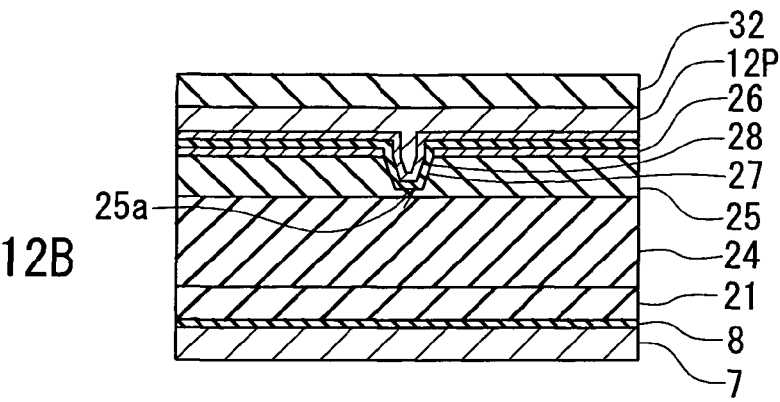
Figure 12C:
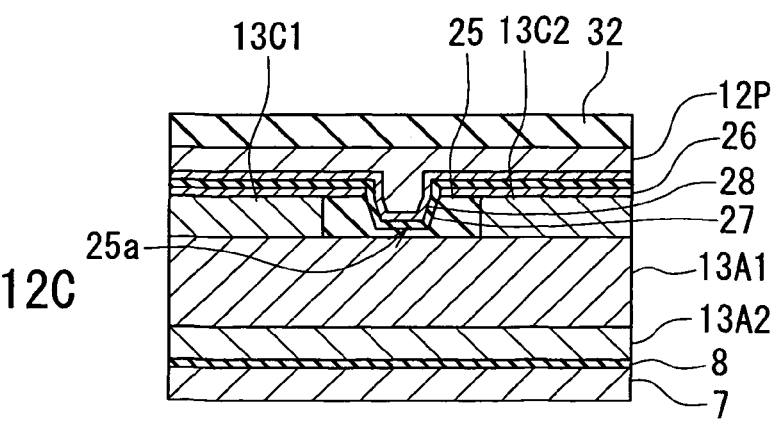

FIG. 12A to FIG. 12C illustrate the following step. FIG. 12A shows a cross section of a layered structure obtained in the manufacturing process of the magnetic head, the cross section being orthogonal to the medium facing surface and the substrate. FIG. 12B shows a cross section of the layered structure taken along line 12B-12B of FIG. 12A. FIG. 12C shows a cross section of the layered structure taken along line 12C-12C of FIG. 12A.

In the step, first, the nonmagnetic film 27 is formed on the entire top surface of the layered structure. The nonmagnetic film 27 is formed in the groove 25a of the encasing layer 25, too. The nonmagnetic film 27 is formed by sputtering or chemical vapor deposition (hereinafter referred to as CVD), for example. It is possible to control the thickness of the nonmagnetic film 27 with precision. It is thereby possible to control the track width with accuracy. In the case of forming the nonmagnetic film 27 by CVD, it is preferred to employ a method called 'atomic layer CVD' (ALCVD) in which formation of a single atomic layer is repeated. In this case, it is possible to control the thickness of the nonmagnetic film 27 with higher precision. In the case of forming the nonmagnetic film 27 by ALCVD, it is preferred to use alumina among insulating materials, or Ta or Ru among conductive materials, as the material of the nonmagnetic film 27. If a semiconductor material is selected as the material of the nonmagnetic film 27, it is preferred to form the nonmagnetic film 27 by ALCVD at a low temperature (around 200° C.) or by low-pressure CVD at a low temperature. The semiconductor material as the material of the nonmagnetic film 27 is preferably undoped polycrystalline silicon or amorphous silicon.

Next, the polishing stopper layer 28 is formed on the entire top surface of the layered structure. The polishing stopper layer 28 is formed in the groove 25a of the encasing layer 25, too. The polishing stopper layer 28 indicates the level at which polishing of the polishing step to be performed later is stopped. If the nonmagnetic film 27 is made of a conductive material, it is possible to make the nonmagnetic film 27 function as the polishing stopper layer 28, too, without providing the polishing stopper layer 28.

If a nonmagnetic conductive material is selected as the material of the polishing stopper layer 28, the polishing stopper layer 28 is formed by sputtering or CVD, for example. In the case of forming the polishing stopper layer 28 by CVD, it is preferred to employ ALCVD. In the case of forming the polishing stopper layer 28 by ALCVD using a nonmagnetic conductive material, Ta or Ru is preferred as the material of the polishing stopper layer 28. The polishing stopper layer 28 formed by ALCVD exhibits a good step coverage. Therefore, it is possible to form the polishing stopper layer 28 that is uniform in the groove 25a of the encasing layer 25 by employing ALCVD to form the polishing stopper layer 28. It is thereby possible to control the track width with accuracy. In the case of forming the polishing stopper layer 28 by ALCVD, the nonmagnetic film 27 for controlling the track width may be omitted.

If the polishing stopper layer 28 is formed by ALCVD using a nonmagnetic conductive material, it is possible to reduce the resistance of the electrode layer (seed layer) used for forming the pole layer 12 by plating. It is thereby possible to form the pole layer 12 having a precise thickness.

Next, portions of the nonmagnetic film 27 and the polishing stopper layer 28 located on the third layer 13A3 are selectively etched to form the contact holes in the nonmagnetic film 27 and the polishing stopper layer 28.

Next, a magnetic layer 12P that will be the pole layer 12 later is formed on the entire top surface of the layered structure. The magnetic layer 12P is formed by the following method, for example. First, an electrode film to be a portion of an electrode layer (seed layer) for plating is formed on the entire top surface of the layered structure. The electrode film is made of a magnetic material and will be a portion of the pole layer 12 later. The electrode film is formed by sputtering or ion beam deposition, for example. In the case of forming the electrode film by sputtering, it is preferred to employ collimation sputtering or long throw sputtering. Alternatively, the polishing stopper layer 28 may be used as the electrode layer (seed layer) for plating instead of forming the electrode film made of a magnetic material. Next, a plating layer is formed on the electrode film by frame plating, for example. The plating layer has a thickness of 0.5 to 1.0 μm, for example. The plating layer is made of a magnetic material and will be a major portion of the pole layer 12 later. The plating layer is formed such that the top surface thereof is located higher than the top surfaces of the nonmagnetic metal layer 26, the nonmagnetic film 27 and the polishing stopper layer 28.

Next, a coating layer 32 made of alumina, for example, and having a thickness of 0.5 to 1.2 μm, for example, is formed by a method such as sputtering on the entire top surface of the layered structure.

FIG. 13A to FIG. 13C illustrate the following step. FIG. 13A shows a cross section of a layered structure obtained in the manufacturing process of the magnetic head, the cross section being orthogonal to the medium facing surface and the substrate. FIG. 13B shows a cross section of the layered structure taken along line 13B-13B of FIG. 13A. FIG. 13C shows a cross section of the layered structure taken along line 13C-13C of FIG. 13A.

In the step, first, the coating layer 32 and the magnetic layer 12P are polished by CMP, for example, so that the polishing stopper layer 28 is exposed, and the top surfaces of the polishing stopper layer 28 and the magnetic layer 12P are thereby flattened. In the case of polishing the coating layer 32 and the magnetic layer 12P by CMP, such a slurry is used that polishing is stopped when the polishing stopper layer 28 is exposed, such as an alumina-base slurry.

Figure 14A:
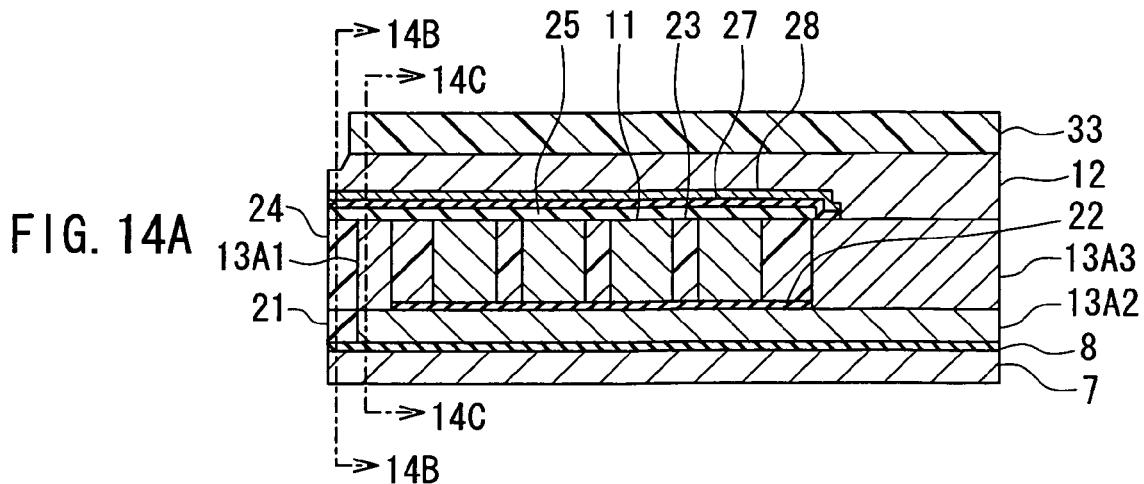
FIG. 14A to FIG. 14C are views for illustrating a step that follows the step shown in FIG. 13A to FIG. 13C.
Figure 14B:
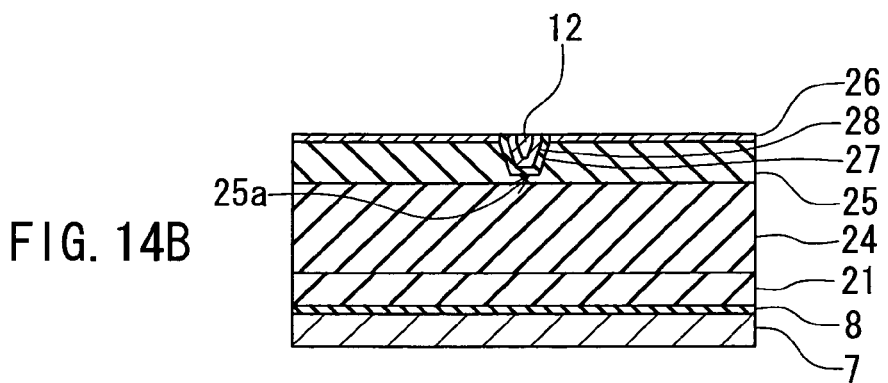
Figure 14C:
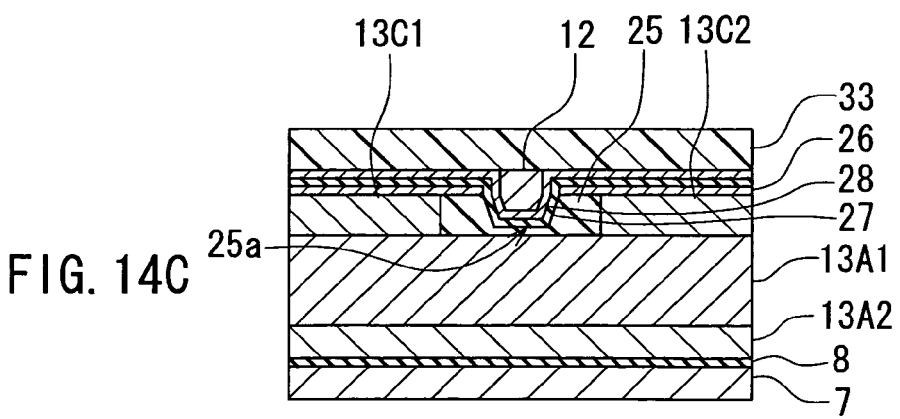

FIG. 14A to FIG. 14C illustrate the following step. FIG. 14A shows a cross section of a layered structure obtained in the manufacturing process of the magnetic head, the cross section being orthogonal to the medium facing surface and the substrate. FIG. 14B shows a cross section of the layered structure taken along line 14B-14B of FIG. 14A. FIG. 14C shows a cross section of the layered structure taken along line 14C-14C of FIG. 14A.

In the step, first, a photoresist layer is formed on the entire top surface of the layered structure. The photoresist layer is then patterned to form a mask 33 for etching a portion of the magnetic layer 12P. The mask 33 covers a portion of the top surface of the magnetic layer 12P that will be the top surface of the second portion of the pole layer 12 later. Next, the portion of the magnetic layer 12P is etched by ion beam etching, for example, using the mask 33. The magnetic layer 12P is thereby formed into the pole layer 12. This etching is performed such that the second side A2 of the end face of the pole layer 12 located in the medium facing surface 30 is located at a level that falls within a range between the height of the top surface of the nonmagnetic metal layer 26 as initially formed and the height of the bottom surface thereof. Therefore, the nonmagnetic metal layer 26 serves as the reference indicating the level at which this etching is stopped. By etching the portion of the magnetic layer 12P in the foregoing manner, it is possible that each of the track width and the thickness of the pole layer 12 taken in the medium facing surface 30 is controlled to be nearly uniform. It is thereby possible to control the thickness of the pole layer 12 and the track width with precision. Next, the mask 33 is removed.

Figure 15A:
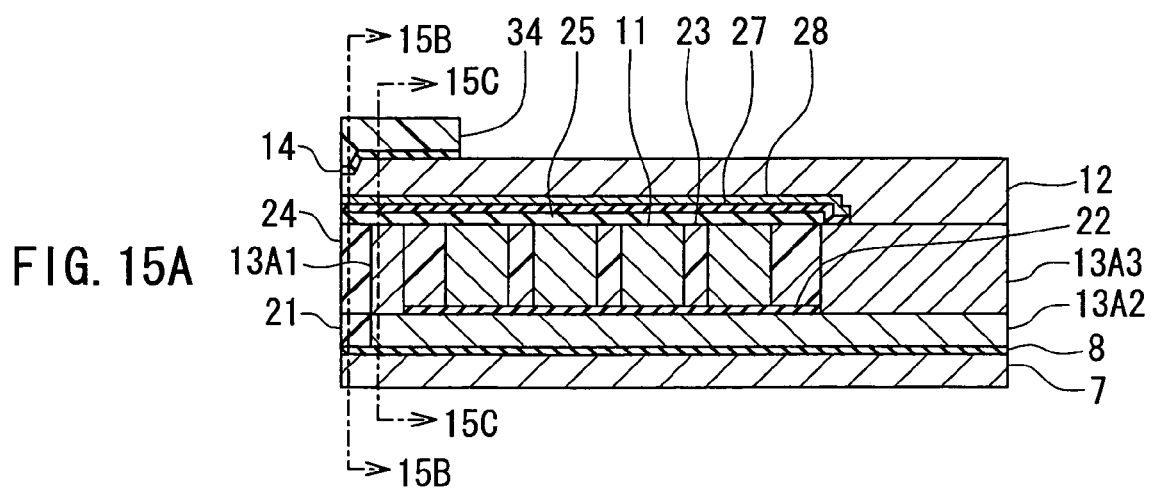
FIG. 15A to FIG. 15C are views for illustrating a step that follows the step shown in FIG. 14A to FIG. 14C.
Figure 15B:
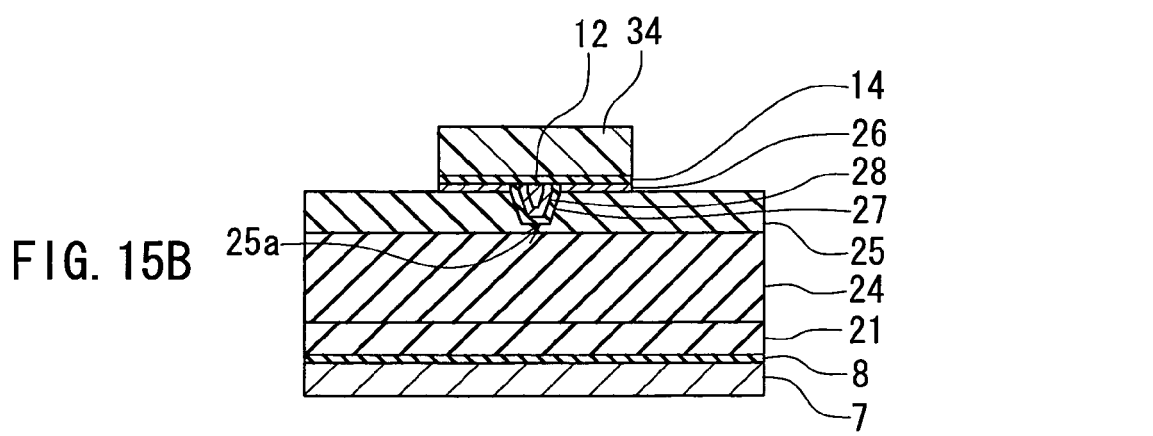
Figure 15C:
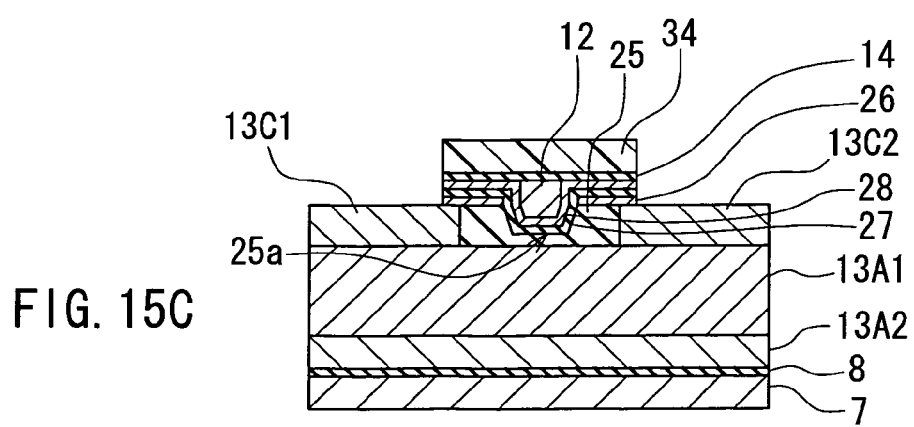

FIG. 15A to FIG. 15C illustrate the following step. FIG. 15A shows a cross section of a layered structure obtained in the manufacturing process of the magnetic head, the cross section being orthogonal to the medium facing surface and the substrate. FIG. 15B shows a cross section of the layered structure taken along line 15B-15B of FIG. 15A. FIG. 15C shows a cross section of the layered structure taken along line 15C-15C of FIG. 15A.

In the step, first, the gap layer 14 is formed on the entire top surface of the layered structure. The gap layer 14 is formed by sputtering or CVD, for example. In the case of forming the gap layer 14 by CVD, it is preferred to employ ALCVD. In the case of forming the gap layer 14 by ALCVD, the material of the gap layer 14 is preferably alumina among insulating materials, or Ta or Ru among conductive materials. The gap layer 14 formed by ALCVD exhibits a good step coverage. Therefore, it is possible to form the gap layer 14 that is thin and uniform on the bending top surface of the pole layer 12 by employing ALCVD to form the gap layer 14.

Next, a photoresist layer is formed on the entire top surface of the layered structure. The photoresist layer is then patterned to form a mask 34. The mask 34 covers a portion of the gap layer 14 to be left. Next, the gap layer 14, the nonmagnetic metal layer 26, the nonmagnetic film 27 and the polishing stopper layer 28 are selectively etched using the mask 34. As a result, the top surfaces of the coupling portions 13C1 and 13C2 are exposed, and a portion of the top surface of the pole layer 12 is exposed. Next, the mask 34 is removed.

Figure 16A:
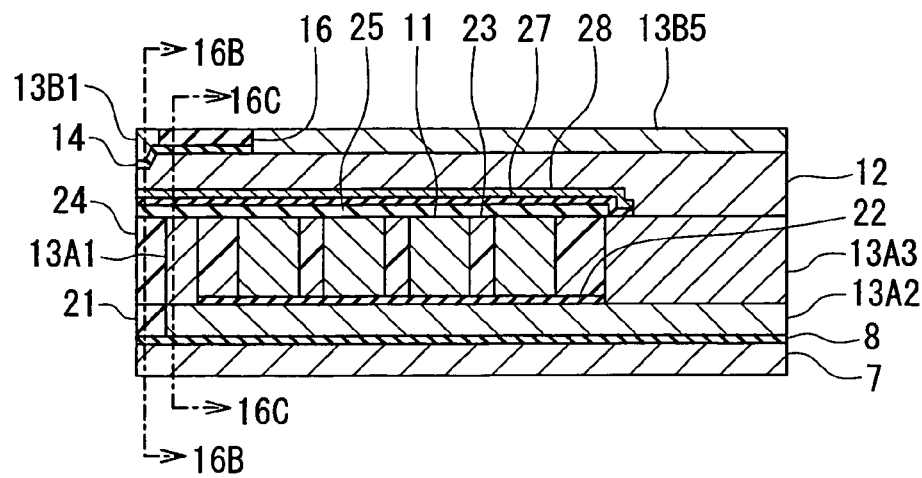
FIG. 16A to FIG. 16C are views for illustrating a step that follows the step shown in FIG. 15A to FIG. 15C.
Figure 16B:
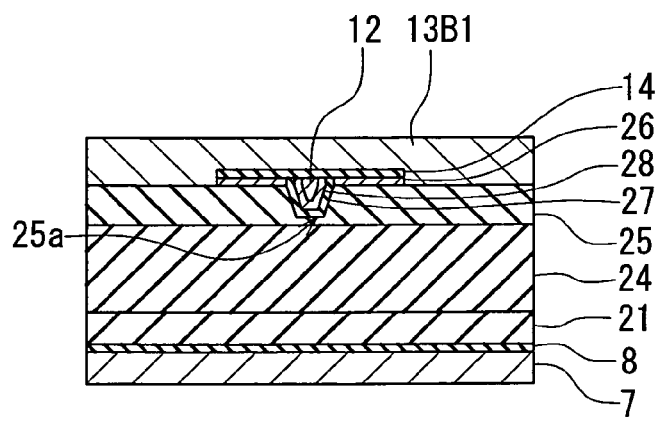
Figure 16C:
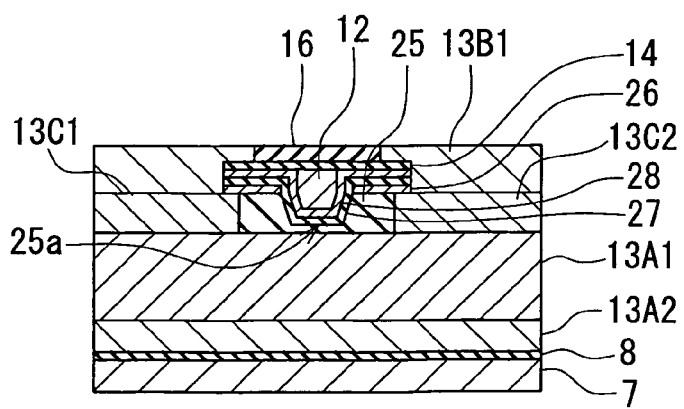

FIG. 16A to FIG. 16C illustrate the following step. FIG. 16A shows a cross section of a layered structure obtained in the manufacturing process of the magnetic head, the cross section being orthogonal to the medium facing surface and the substrate. FIG. 16B shows a cross section of the layered structure taken along line 16B-16B of FIG. 16A. FIG. 16C shows a cross section of the layered structure taken along line 16C-16C of FIG. 16A.

In the step, first, the first layer 13B1 of the second portion 13B of the shield 13 is formed on the coupling portions 13C1 and 13C2 and the gap layer 14. At the same time, the upper yoke layer 13B5 is formed on the pole layer 12. The first layer 13B1 and the upper yoke layer 13B5 may be formed by frame plating, or by making a magnetic layer through sputtering and then selectively etching the magnetic layer. Next, the nonmagnetic layer 16 is formed on the entire top surface of the layered structure. Next, the nonmagnetic layer 16 is polished by CMP, for example, so that the first layer 13B1 and the upper yoke layer 13B5 are exposed, and the top surfaces of the first layer 13B1, the upper yoke layer 13B5 and the nonmagnetic layer 16 are flattened.

Figure 17A:
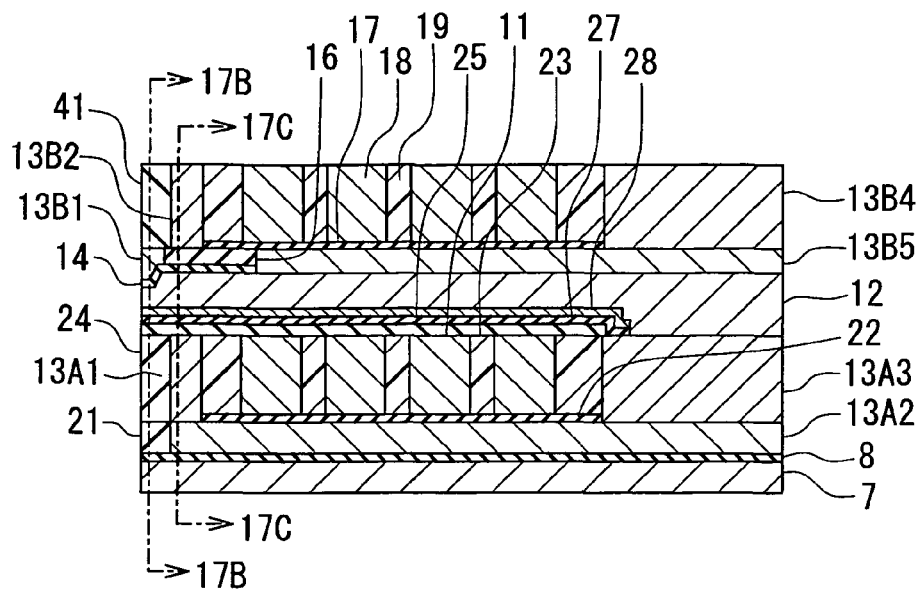
FIG. 17A to FIG. 17C are views for illustrating a step that follows the step shown in FIG. 16A to FIG. 16C.
Figure 17B:
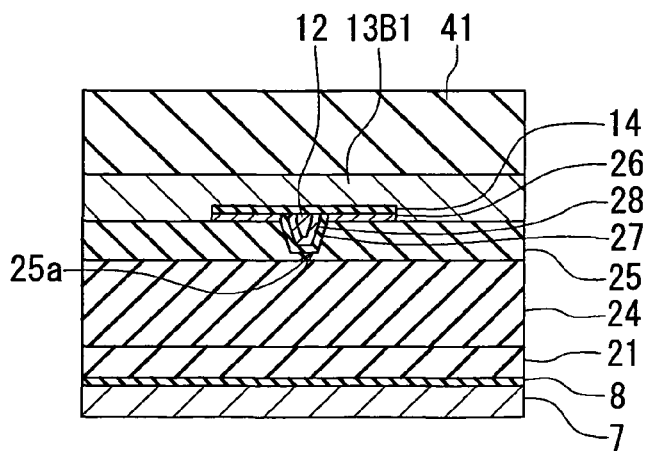
Figure 17C:
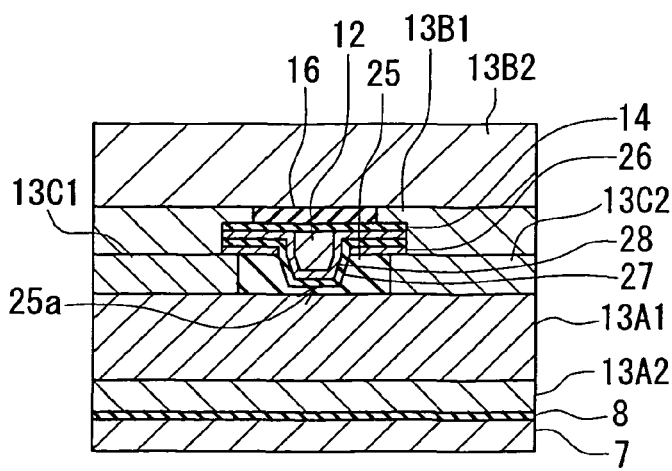

FIG. 17A to FIG. 17C illustrate the following step. FIG. 17A shows a cross section of a layered structure obtained in the manufacturing process of the magnetic head, the cross section being orthogonal to the medium facing surface and the substrate. FIG. 17B shows a cross section of the layered structure taken along line 17B-17B of FIG. 17A. FIG. 17C shows a cross section of the layered structure taken along line 17C-17C of FIG. 17A.

In the step, first, the insulating layer 17 is formed on regions of the top surfaces of the upper yoke layer 13B5 and the nonmagnetic layer 16 where the coil 18 is to be disposed. Next, the coil 18 is formed on the insulating layer 17 by frame plating, for example. Next, the second layer 13B2 and the fourth layer 13B4 of the second portion 13B are formed by frame plating, for example. Alternatively, the coil 18 may be formed after the second layer 13B2 and the fourth layer 13B4 are formed.

Next, the insulating layer 19 made of photoresist, for example, is selectively formed around the coil 18 and in the space between the respective adjacent turns of the coil 18. Next, the insulating layer 41 having a thickness of 3 to 4 μm, for example, is formed by a method such as sputtering on the entire top surface of the layered structure. Next, the insulating layer 41 is polished by CMP, for example, so that the second layer 13B2, the fourth layer 13B4, and the coil 18 are exposed, and the top surfaces of the second layer 13B2, the fourth layer 13B4, the coil 18, and the insulating layers 19 and 41 are thereby flattened.

Next, as shown in FIG. 2, the insulating layer 20 is formed on the coil 18 and the insulating layer 19. Next, the third layer 13B3 of the second portion 13B are formed by frame plating, for example, to complete the shield 13.

Next, the protection layer 42 is formed to cover the entire top surface of the layered structure. Wiring and terminals are then formed on the protection layer 42, the substrate is cut into sliders, and the steps including polishing of the medium facing surface 30 and fabrication of flying rails are performed. The magnetic head is thus completed.

The operation and effects of the magnetic head of the embodiment will now be described. The magnetic head writes data on a recording medium by using the write head and reads data written on the recording medium by using the read head. In the write head the coils 11 and 18 each generate a magnetic field that corresponds to the data to be written on the medium. A magnetic flux corresponding to the magnetic field generated by the coil 11 passes through the first portion 13A of the shield 13 and the pole layer 12. A magnetic flux corresponding to the magnetic field generated by the coil 18 passes through the second portion 13B of the shield 13 and the pole layer 12. Therefore, the pole layer 12 allows the flux corresponding to the field generated by the coil 11 and the flux corresponding to the field generated by the coil 18 to pass.

The coils 11 and 18 may be connected to each other either in series or parallel. In either case, the coils 11 and 18 are connected to each other in such a manner that, in the pole layer 12, the flux corresponding to the field generated by the coil 11 and the flux corresponding to the field generated by the coil 18 flow in the same direction. In FIG. 2 the arrows in the pole layer 12 and the shield 13 schematically show the directions in which the fluxes flow.

As described above, the pole layer 12 allows the flux corresponding to the field generated by each of the coils 11 and 18 to pass and generates a write magnetic field used for writing the data on the recording medium by means of the perpendicular magnetic recording system.

The shield 13 takes in a disturbance magnetic field applied from outside the magnetic head to the magnetic head. It is thereby possible to prevent erroneous writing on the recording medium caused by the disturbance magnetic field intensively taken in into the pole layer 12. Furthermore, the shield 13 has a function of taking in a magnetic flux that is generated from the end face of the pole layer 12 and that extends in directions except the direction orthogonal to the surface of the recording medium, and preventing this flux from reaching the recording medium. The shield 13 also has a function of returning a magnetic flux that has been generated from the end face of the pole layer 12 and has magnetized the recording medium.

The shield 13 incorporates: the first portion 13A located backward of the pole layer 12 along the direction T of travel of the recording medium; and the second portion 13B located forward of the pole layer 12 along the direction T of travel of the recording medium. Therefore, according to the embodiment, in regions both forward and backward of the end face of the pole layer 12 along the direction T of travel of the recording medium, it is possible to take in the magnetic flux generated from the end face of the pole layer 12 and extending in directions except the direction orthogonal to the surface of the recording medium, and to thereby prevent this flux from reaching the recording medium. It is thereby possible to suppress the occurrence of wide-range adjacent track erase.

According to the embodiment, the magnetic fluxes corresponding to the magnetic fields generated by the two coils 11 and 18 pass through the pole layer 12. As a result, it is possible to make the number of turns of each of the coils 11 and 18 smaller than that of a single coil of a magnetic head in which the coil is the only one coil provided. It is thereby possible to reduce the resistance of each of the coils 11 and 18 so as to reduce the heat value of each of the coils 11 and 18. As a result, according to the embodiment, it is possible to suppress protrusion of a portion of the medium facing surface 30 due to the heat generated by the coils 11 and 18.

The location of an end of the bit pattern to be written on the recording medium is determined by the location of an end of the end face of the pole layer 12 located in the medium facing surface 30, the end being located forward along the direction T of travel of the recording medium. Therefore, to define the location of the end of the bit pattern with precision, it is important to take in a magnetic flux particularly at a location forward of the end face of the pole layer 12 along the direction T of travel of the recording medium, the flux being generated from the end face of the pole layer 12 and extending in directions except the direction orthogonal to the surface of the recording medium, so as to prevent the flux from reaching the recording medium. In the embodiment, the first portion 13A of the shield 13 has an end face located closer to the medium facing surface 30, and this end face is located at a distance from the medium facing surface 30. In addition, the second portion 13B of the shield 13 has an end face located in the medium facing surface 30. The end face of the second portion 13B is located forward of the end face of the pole layer 12 along the direction T of travel of the recording medium with a specific small space created therebetween by the thickness of the gap layer 14. As a result, particularly at a location forward of the end face of the pole layer 12 along the direction T of travel of the recording medium, it is possible to effectively take in the magnetic flux generated from the end face of the pole layer 12 and extending in directions except the direction orthogonal to the surface of the recording medium, and to thereby prevent the flux from reaching the recording medium. Furthermore, according to the embodiment, the first portion 13A and the second portion 13B of the shield 13 are coupled to each other by the coupling portions 13C1 and 13C2. As a result, it is possible to allow the flux taken in from the end face of the second portion 13B to pass through not only the second portion 13B but also the first portion 13A. It is therefore possible to take in magnetic fluxes of greater amount from the end face of the second portion 13B. Because of the foregoing features of the embodiment, it is possible to precisely define the location of the end of the bit pattern to be written on the recording medium. According to the embodiment, an improvement in linear recording density is thereby achieved.

According to the embodiment, the first layer 13B1 of the second portion 13B of the shield 13 incorporates: the middle portion 13B1a including the portion opposed to the pole layer 12 with the gap layer 14 disposed in between; and the two side portions 13B1b and 13B1c located outside the middle portion 13B1a along the direction of track width. To improve the overwrite property, it is preferred that the middle portion 13B1a be small in length taken in the direction orthogonal to the medium facing surface 30. In the embodiment, the maximum length of each of the side portions 13B1b and 13B1c taken in the direction orthogonal to the medium facing surface 30 is greater than the length of the middle portion 13B1a taken in the direction orthogonal to the medium facing surface 30. The coupling portions 13C1 and 13C2 are connected to the side portions 13B1b and 13B1c, respectively. In addition, the second layer 13B2 does not touch the middle portion 13B1a of the first layer 13B1 but touches the side portions 13B1b and 13B1c. As a result, according to the embodiment, it is possible to increase the cross-sectional area of the magnetic path formed by the shield 13 in a neighborhood of the medium facing surface 30 even if the length of the middle portion 13B1a taken in the direction orthogonal to the medium facing surface 30 is reduced. It is thereby possible to improve the overwrite property while preventing saturation of magnetic flux halfway through the shield 13 near the medium facing surface 30.

According to the embodiment, as shown in FIG. 3, the end face of the pole layer 12 located in the medium facing surface 30 has a width that decreases as the distance from the gap layer 14 increases. It is thereby possible to prevent the problems resulting from the skew.

According to the embodiment, the pole layer 12 is disposed in the groove 25a of the encasing layer 25 made of a nonmagnetic material, the nonmagnetic film 27 and the polishing stopper layer 28 being disposed between the pole layer 12 and the groove 25a. Consequently, the pole layer 12 is smaller than the groove 25a in width. It is thereby possible to easily form the groove 25a and to easily reduce the width of the pole layer 12 and the width of the top surface of the track width defining portion 12A that defines the track width, in particular. As a result, according to the embodiment, it is possible to easily implement the track width that is smaller than the minimum track width that can be formed by photolithography and to control the track width with accuracy.

[Second Embodiment]

Figure 18:
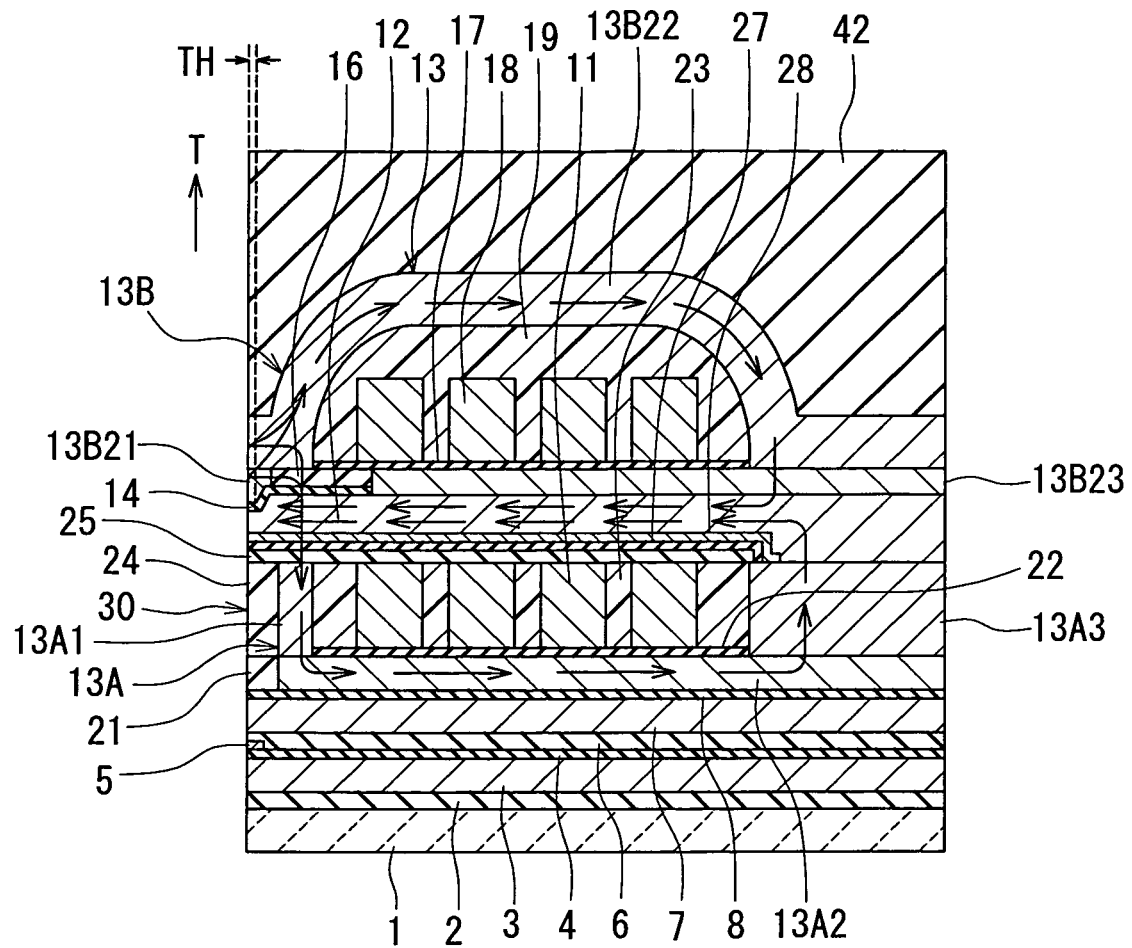
FIG. 18 is a cross-sectional view for illustrating the configuration of a magnetic head of a second embodiment of the invention.

Reference is now made to FIG. 18 to describe a magnetic head and a method of manufacturing the same of a second embodiment of the invention. FIG. 18 is a cross-sectional view for illustrating the configuration of the magnetic head of the second embodiment. FIG. 18 illustrates a cross section orthogonal to the medium facing surface and the plane of the substrate. The arrow indicated with T in FIG. 18 shows the direction of travel of a recording medium.

In the magnetic head of the second embodiment, the insulating layer 19 is provided to cover the coil 18. In the second embodiment the insulating layers 20 and 41 of the first embodiment are not provided. The second portion 13B of the shield 13 of the second embodiment incorporates a first layer 13B21, a second layer 13B22 and an upper yoke layer 13B23. These layers may be made of any of CoFeN, CoNiFe, NiFe and CoFe, for example. The shapes and locations of the first layer 13B21 and the upper yoke layer 13B23 are the same as those of the first layer 13B1 and the upper yoke layer 13B5 of the first embodiment, respectively. The second layer 13B22 is disposed to couple the first layer 13B21 to the upper yoke layer 13B23. The second layer 13B22 includes a portion located to sandwich at least part of the coil 18 between the pole layer 12 and itself. In addition, the second layer 13B22 has an end face located in the medium facing surface 30. Alternatively, the second layer 13B22 may have an end face that is closer to the medium facing surface 30 and that is located at a distance from the medium facing surface 30.

The method of manufacturing the magnetic head of the second embodiment includes the steps up to the step illustrated in FIG. 16A to FIG. 16C that are the same as those of the first embodiment. In the second embodiment, however, the first layer 13B21 and the upper yoke layer 13B23 are formed in place of the first layer 13B1 and the upper yoke layer 13B5 of the first embodiment. In the following step of the second embodiment, the insulating layer 17 is formed on regions of the top surfaces of the upper yoke layer 13B23 and the nonmagnetic layer 16 where the coil 18 is to be disposed. Next, the coil 18 is formed on the insulating layer 17 by frame plating, for example. Next, the insulating layer 19 made of photoresist, for example, is selectively formed to cover the coil 18. Next, the second layer 13B22 is formed by frame plating, for example, to complete the second portion 13B of the shield 13. Next, the protection layer 42 is formed to cover the entire top surface of the layered structure. Wiring and terminals are then formed on the protection layer 42, the substrate is cut into sliders, and the steps including polishing of the medium facing surface 30 and fabrication of flying rails are performed. The magnetic head is thus completed.

In FIG. 18 the arrows in the pole layer 12 and the shield 13 schematically show the directions in which magnetic fluxes flow. The remainder of configuration, function and effects of the second embodiment are similar to those of the first embodiment.

[Third Embodiment]

Figure 19:
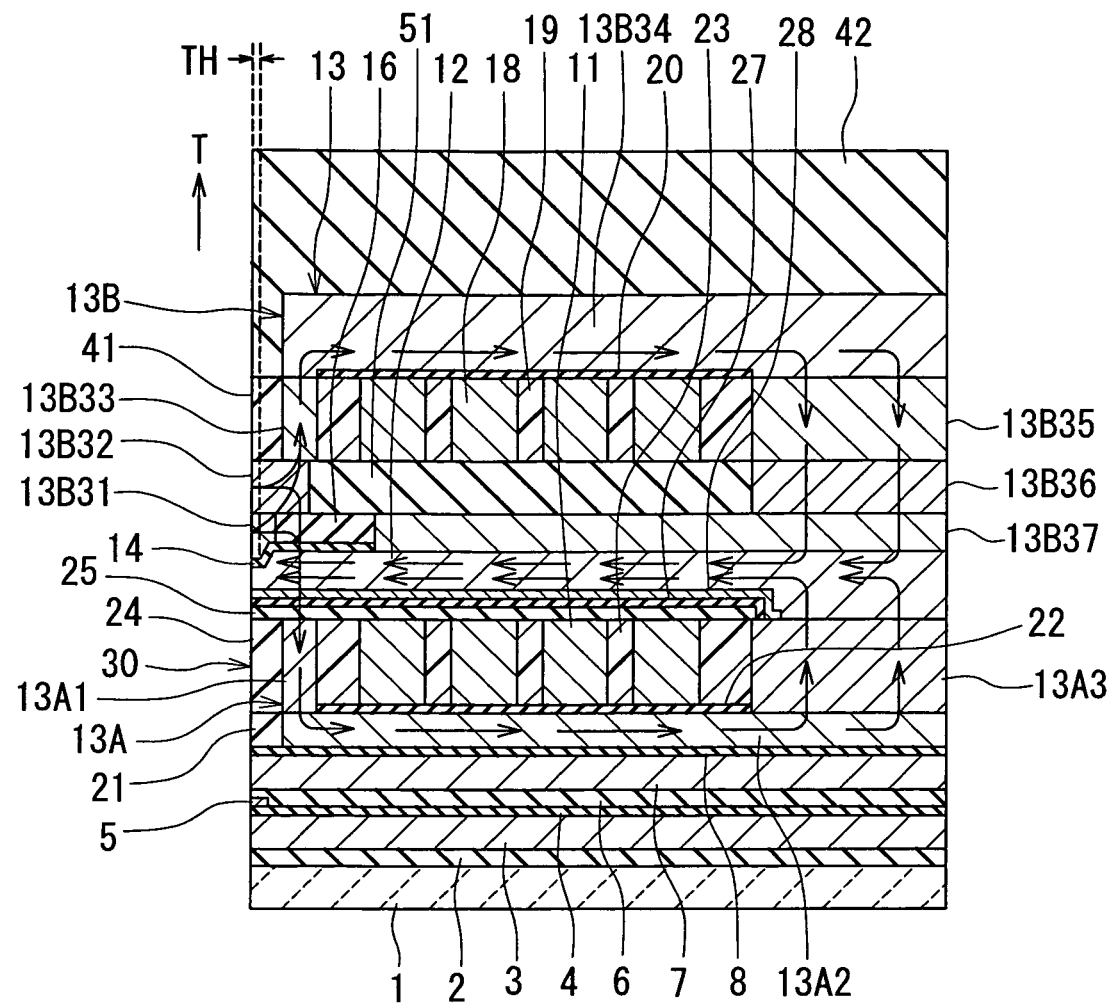
FIG. 19 is a cross-sectional view for illustrating the configuration of a magnetic head of a third embodiment of the invention.

Reference is now made to FIG. 19 to describe a magnetic head and a method of manufacturing the same of a third embodiment of the invention. FIG. 19 is a cross-sectional view for illustrating the configuration of the magnetic head of the third embodiment. FIG. 19 illustrates a cross section orthogonal to the medium facing surface and the plane of the substrate. The arrow indicated with T in FIG. 19 shows the direction of travel of a recording medium.

The second portion 13B of the shield 13 of the third embodiment incorporates a first layer 13B31, a second layer 13B32, a third layer 13B33, a fourth layer 13B34, a fifth layer 13B35, a sixth layer 13B36, and an upper yoke layer 13B37. These layers may be made of any of CoFeN, CoNiFe, NiFe and CoFe, for example. The shapes and locations of the first layer 13B31 and the upper yoke layer 13B37 are the same as those of the first layer 13B1 and the upper yoke layer 13B5 of the first embodiment, respectively.

The second layer 13B32 is disposed on the first layer 13B31 and connected to the first layer 13B31. The second layer 13B32 has an end face located in the medium facing surface 30. In a cross section that intersects the end face of the pole layer 12 located in the medium facing surface 30 and that is orthogonal to the medium facing surface 30 and the plane of the substrate 1, the length of the second layer 13B32 taken in the direction orthogonal to the medium facing surface 30 is greater than the length of the first layer 13B31 taken in the direction orthogonal to the medium facing surface 30.

The sixth layer 13B36 is disposed on a region of the upper yoke layer 13B37 away from the medium facing surface 30 and connected to the upper yoke layer 13B37. The magnetic head of the third embodiment comprises an insulating layer 51 made of an insulating material and disposed around the second layer 13B32 and the sixth layer 13B36. The insulating layer 51 is made of alumina, for example.

The third layer 13B33 is disposed on the second layer 13B32 and connected to the second layer 13B32. The third layer 13B33 has an end face located closer to the medium facing surface 30, and this end face is located at a distance from the medium facing surface 30. The fifth layer 13B35 is disposed on a region of the sixth layer 13B36 away from the medium facing surface 30 and connected to the sixth layer 13B36.

The coil 18 is disposed on the insulating layer 51. The coil 18 is wound around the fifth layer 13B35. As in the first embodiment, the insulating layer 19 is disposed around the coil 18 and in the space between the respective adjacent turns of the coil 18, and the insulating layer 20 is disposed to cover the coil 18 and the insulating layer 19. In the third embodiment the insulating layer 41 is disposed around the insulating layer 19, the third layer 13B33 and the fifth layer 13B35.

The fourth layer 13B34 is disposed to couple the third layer 13B33 to the fifth layer 13B35. The fourth layer 13B34 has an end face located closer to the medium facing surface 30, and this end face is located at a distance from the medium facing surface 30.

The method of manufacturing the magnetic head of the third embodiment includes the steps up to the step illustrated in FIG. 16A to FIG. 16C that are the same as those of the first embodiment. In the third embodiment, however, the first layer 13B31 and the upper yoke layer 13B37 are formed in place of the first layer 13B1 and the upper yoke layer 13B5 of the first embodiment.

In the following step of the third embodiment, the second layer 13B32 is formed on the first layer 13B31 and the nonmagnetic layer 16. At the same time, the sixth layer 13B36 is formed on the upper yoke layer 13B37. The second layer 13B32 and the sixth layer 13B36 may be formed by frame plating, or by making a magnetic layer through sputtering and then selectively etching the magnetic layer. Next, the insulating layer 51 is formed on the entire top surface of the layered structure. Next, the insulating layer 51 is polished by CMP, for example, so that the second layer 13B32 and the sixth layer 13B36 are exposed, and the top surfaces of the second layer 13B32, the sixth layer 13B36 and the insulating layer 51 are flattened.

Next, the coil 18 is formed on the insulating layer 51 by frame plating, for example. Next, the third layer 13B33 and the fifth layer 13B35 are formed by frame plating, for example. Alternatively, the coil 18 may be formed after the third layer 13B33 and the fifth layer 13B35 are formed. Next, the insulating layer 19 made of photoresist, for example, is selectively formed around the coil 18 and in the space between the respective adjacent turns of the coil 18. Next, the insulating layer 41 is formed on the entire top surface of the layered structure. Next, the insulating layer 41 is polished by CMP, for example, so that the third layer 13B33, the fifth layer 13B35, and the coil 18 are exposed, and the top surfaces of the third layer 13B33, the fifth layer 13B35, the coil 18, and the insulating layers 19 and 41 are thereby flattened.

Next, the insulating layer 20 is formed on the coil 18 and the insulating layer 19. Next, the fourth layer 13B34 is formed by frame plating, for example, to complete the shield 13. Next, the protection layer 42 is formed to cover the entire top surface of the layered structure. Wiring and terminals are then formed on the protection layer 42, the substrate is cut into sliders, and the steps including polishing of the medium facing surface 30 and fabrication of flying rails are performed. The magnetic head is thus completed.

In FIG. 19 the arrows in the pole layer 12 and the shield 13 schematically show the directions in which magnetic fluxes flow. According to the embodiment, the second portion 13B of the shield 13 incorporates the second layer 13B32 having the end face located in the medium facing surface 30. Therefore, in the embodiment, the volume of the layered structure made up of the first layer 13B31 and the second layer 13B32 is increased in the neighborhood of the medium facing surface 30. As a result, according to the embodiment, a magnetic flux that is generated from the end face of the pole layer 12 and returns to the magnetic head through the end face of the shield 13 located in the medium facing surface 30 after magnetizing the recording medium is prevented from being saturated halfway through the shield 13 near the medium facing surface 30. As a result, it is possible to improve the overwrite property of the magnetic head. The remainder of configuration, function and effects of the third embodiment are similar to those of the first embodiment. neighborhood of the medium facing surface 30. As a result, according to the embodiment, a magnetic flux that is generated from the end face of the pole layer 12 and returns to the magnetic head through the end face of the shield 13 located in the medium facing surface 30 after magnetizing the recording medium is prevented from being saturated halfway through the shield 13 near the medium facing surface 30. As a result, it is possible to improve the overwrite property of the magnetic head. The remainder of configuration, function and effects of the third embodiment are similar to those of the first embodiment.

[Fourth Embodiment]

Figure 20:
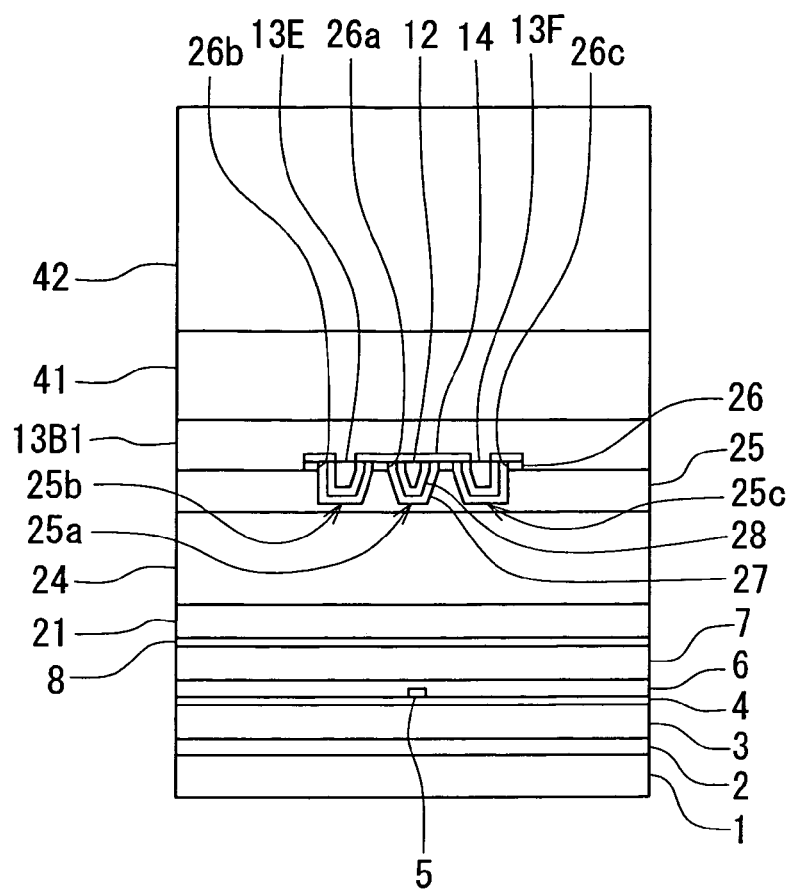
FIG. 20 is a front view of the medium facing surface of a magnetic head of a fourth embodiment of the invention.

A magnetic head and a method of manufacturing the same of a fourth embodiment of the invention will now be described. Reference is now made to FIG. 20 to describe the configuration of the magnetic head of the embodiment. FIG. 20 is a front view of the medium facing surface of the magnetic head of the embodiment.

As shown in FIG. 20, the shield 13 of the magnetic head of the fourth embodiment incorporates a first side shield layer 13E and a second side shield layer 13F in addition to the first portion 13A, the second portion 13B, and the coupling portions 13C1 and 13C2. The side shield layers 13E and 13F are connected to the first layer 13B1 of the second portion 13B and disposed on both sides of the pole layer 12 opposed to each other in the direction of track width. Each of the side shield layers 13E and 13F has an end face located in the medium facing surface 30. Each of the side shield layers 13E and 13F is made of a magnetic material. The material of the side shield layers 13E and 13F may be the same as that of the pole layer 12.

In the fourth embodiment the encasing layer 25 has grooves 25b and 25c in addition to the groove 25a. The grooves 25b and 25c open in the top surface of the encasing layer 25 and accommodate the side shield layers 13E and 13F. The nonmagnetic metal layer 26 has openings 26b and 26c in addition to the opening 26a. The edges of the openings 26b and 26c are located directly above the edges of the grooves 25b and 25c in the top surface of the encasing layer 25. The nonmagnetic film 27 and the polishing stopper layer 28 are located in the groove 25b and the opening 26b and in the groove 25c and the opening 26c, as well as in the groove 25a and the opening 26a. The nonmagnetic film 27 is disposed to touch the surfaces of the grooves 25b and 25c. The side shield layers 13E and 13F are disposed apart from the surfaces of the grooves 25b and 25c, respectively. The polishing stopper layer 28 is disposed between the nonmagnetic film 27 and the side shield layers 13E and 13F.

Reference is now made to FIG. 21 to FIG. 25 to describe the method of manufacturing the magnetic head of the fourth embodiment. FIG. 21 to FIG. 25 are cross-sectional views of layered structures obtained in manufacturing process of the magnetic head. FIG. 21 to FIG. 25 show cross sections of portions of the layered structures near the medium facing surface, the cross sections being parallel to the medium facing surface. The portions closer to the substrate 1 than the top shield layer 7 are omitted in FIG. 21 to FIG. 25.

The method of manufacturing the magnetic head of the fourth embodiment includes the steps up to the step of flattening the top surfaces of the coupling portions 13C1 and 13C2 and the nonmagnetic layer 25P as shown in FIG. 9A to FIG. 9C that are the same as those of the first embodiment.

Figure 21:
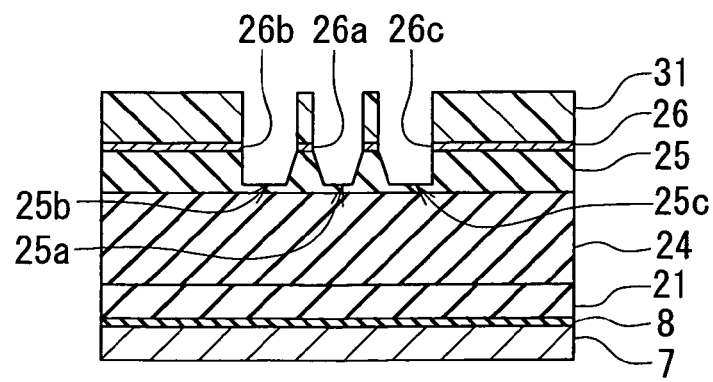
FIG. 21 is a cross-sectional view for illustrating a step of a method of manufacturing the magnetic head of the fourth embodiment of the invention.

FIG. 21 illustrates the following step. In the step, first, the nonmagnetic metal layer 26 is formed by sputtering, for example, on the coupling portions 13C1 and 13C2 and the nonmagnetic layer 25P as in the first embodiment. Next, a photoresist layer having a thickness of 1.0 µm, for example, is formed on the nonmagnetic metal layer 26. The photoresist layer is then patterned to form the mask 31 for making the grooves 25a, 25b and 25c of the encasing layer 25. The mask 31 has three openings having shapes corresponding to the grooves 25a, 25b and 25c, respectively.

Next, the nonmagnetic metal layer 26 is selectively etched using the mask 31. The openings 26a, 26b and 26c that penetrate are thereby formed in the nonmagnetic metal layer 26. The openings 26a, 26b and 26c have shapes corresponding to the plane geometries of the pole layer 12 and the side shield layers 13E and 13F, respectively, to be formed later. Furthermore, portions of the nonmagnetic layer 25P exposed from the openings 26a, 26b and 26c of the nonmagnetic metal layer 26 are selectively etched so as to form the grooves 25a, 25b and 25c in the nonmagnetic layer 25P. Furthermore, a portion of the nonmagnetic layer 25P located on the third layer 13A3 is selectively etched so as to form a contact hole at the bottom of the groove 25a. The mask 31 is then removed. The nonmagnetic layer 25P is formed into the encasing layer 25 by forming the grooves 25a, 25b and 25c therein. The edges of the openings 26a, 26b and 26c of the nonmagnetic metal layer 26 are respectively located directly above the edges of the grooves 25a, 25b and 25c located in the top surface of the encasing layer 25. Each of the nonmagnetic metal layer 26 and the nonmagnetic layer 25P is etched by a method the same as that of the first embodiment.

Figure 22:
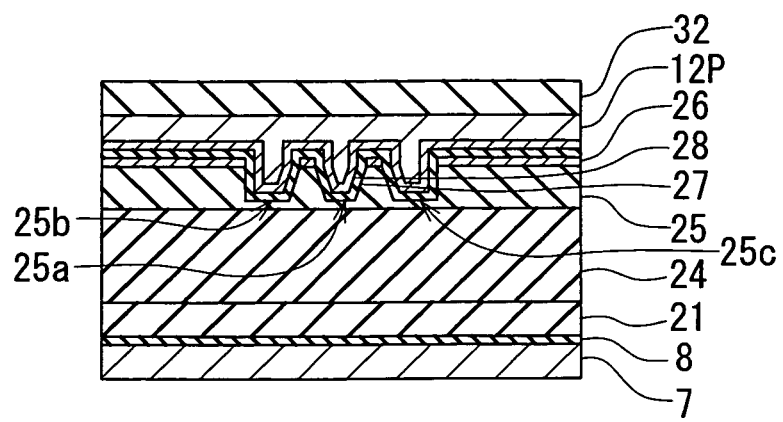
FIG. 22 is a cross-sectional view for illustrating a step that follows the step shown in FIG. 21.

FIG. 22 illustrates the following step. In the step, first, the nonmagnetic film 27 is formed on the entire top surface of the layered structure. The nonmagnetic film 27 is formed in the grooves 25a, 25b and 25c of the encasing layer 25, too. Next, the polishing stopper layer 28 is formed on the entire top surface of the layered structure. The polishing stopper layer 28 is formed in the grooves 25a, 25b and 25c of the encasing layer 25, too. The polishing stopper layer 28 indicates the level at which polishing of the polishing step to be performed later is stopped. Each of the nonmagnetic film 27 and the polishing stopper layer 28 is formed by a method the same as that of the first embodiment. Next, portions of the nonmagnetic film 27 and the polishing stopper layer 28 located on the third layer 13A3 are selectively etched to form contact holes in the nonmagnetic film 27 and the polishing stopper layer 28.

Next, the magnetic layer 12P that will be the pole layer 12 later is formed on the entire top surface of the layered structure. The magnetic layer 12P is formed by a method the same as that of the first embodiment. Next, the coating layer 32 made of alumina, for example, and having a thickness of 0.5 to 1.2 µm, for example, is formed on the entire top surface of the layered structure.

Figure 23:
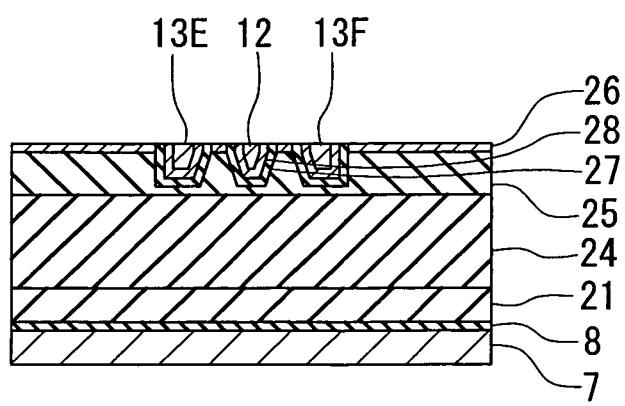
FIG. 23 is a cross-sectional view for illustrating a step that follows the step shown in FIG. 22.

FIG. 23 illustrates the following step. In the step, first, the coating layer 32 and the magnetic layer 12P are polished by CMP, for example, so that the polishing stopper layer 28 is exposed, and the top surfaces of the polishing stopper layer 28 and the magnetic layer 12P are thereby flattened. In the case of polishing the coating layer 32 and the magnetic layer 12P by CMP, such a slurry is used that polishing is stopped when the polishing stopper layer 28 is exposed, such as an alumina-base slurry. Next, a portion of the magnetic layer 12P is etched by a method the same as the step illustrated in FIG. 14A to FIG. 14C of the first embodiment. The magnetic layer 12P is thereby formed into the pole layer 12 and the side shield layers 13E and 13F.

Figure 24:
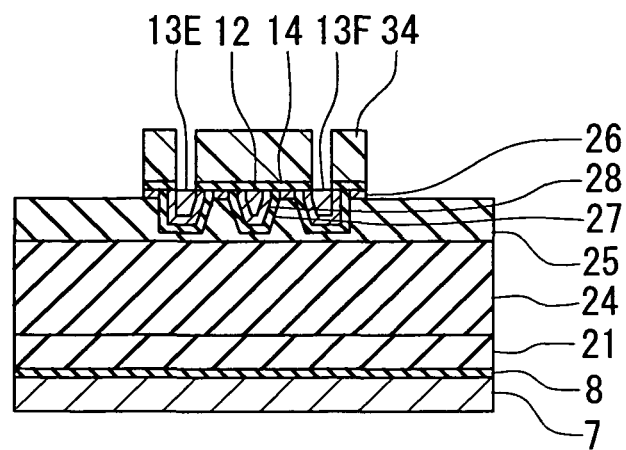
FIG. 24 is a cross-sectional view for illustrating a step that follows the step shown in FIG. 23.

FIG. 24 illustrates the following step. In the step, first, the gap layer 14 is formed on the entire top surface of the layered structure. The gap layer 14 is formed by a method the same as that of the first embodiment. Next, a photoresist layer is formed on the entire top surface of the layered structure. The photoresist layer is then patterned to form the mask 34. The mask 34 covers a portion of the gap layer 14 to be left. The mask 34 of the third embodiment has two openings having shapes corresponding to the shapes of the side shield layers 13E and 13F. Next, the gap layer 14, the nonmagnetic metal layer 26, the nonmagnetic film 27 and the polishing stopper layer 28 are selectively etched using the mask 34. As a result, the top surfaces of the coupling portions 13C1 and 13C2 and the side shield layers 13E and 13F are exposed, and a portion of the top surface of the pole layer 12 is exposed. Next, the mask 34 is removed.

Figure 25:
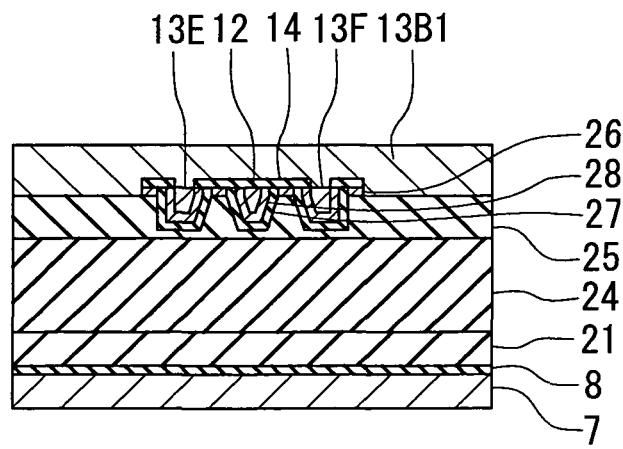
FIG. 25 is a cross-sectional view for illustrating a step that follows the step shown in FIG. 24.

FIG. 25 illustrates the following step. In the step, first, as in the step illustrated in FIG. 16A to FIG. 16C of the first embodiment, the first layer 13B1 is formed on the coupling portions 13C1 and 13C2 and the gap layer 14. At the same time, the upper yoke layer 13B5 is formed on the pole layer 12. In the fourth embodiment, the first layer 13B1 touches the top surfaces of the side shield layers 13E and 13F. Next, as in the step illustrated in FIG. 16A to FIG. 16C, the nonmagnetic layer 16 is formed on the entire top surface of the layered structure. Next, the nonmagnetic layer 16 is polished by CMP, for example, so that the first layer 13B1 and the upper yoke layer 13B5 are exposed, and the top surfaces of the first layer 13B1, the upper yoke layer 13B5 and the nonmagnetic layer 16 are flattened. The steps that follow are the same as those of the first embodiment.

The shield 13 of the fourth embodiment incorporates the side shield layers 13E and 13F. As a result, according to the embodiment, in regions on both sides of the end face of the pole layer 12 opposed to each other in the direction of track width, it is possible to take in a magnetic flux generated from the end face of the pole layer 12 and extending in directions other than the direction orthogonal to the surface of the recording medium, and to thereby prevent the flux from reaching the recording medium. It is thereby possible to further suppress the occurrence of wide-range adjacent track erase. The remainder of configuration, function and effects of the fourth embodiment are similar to those of the first embodiment.

[Modification Example]

Figure 26:
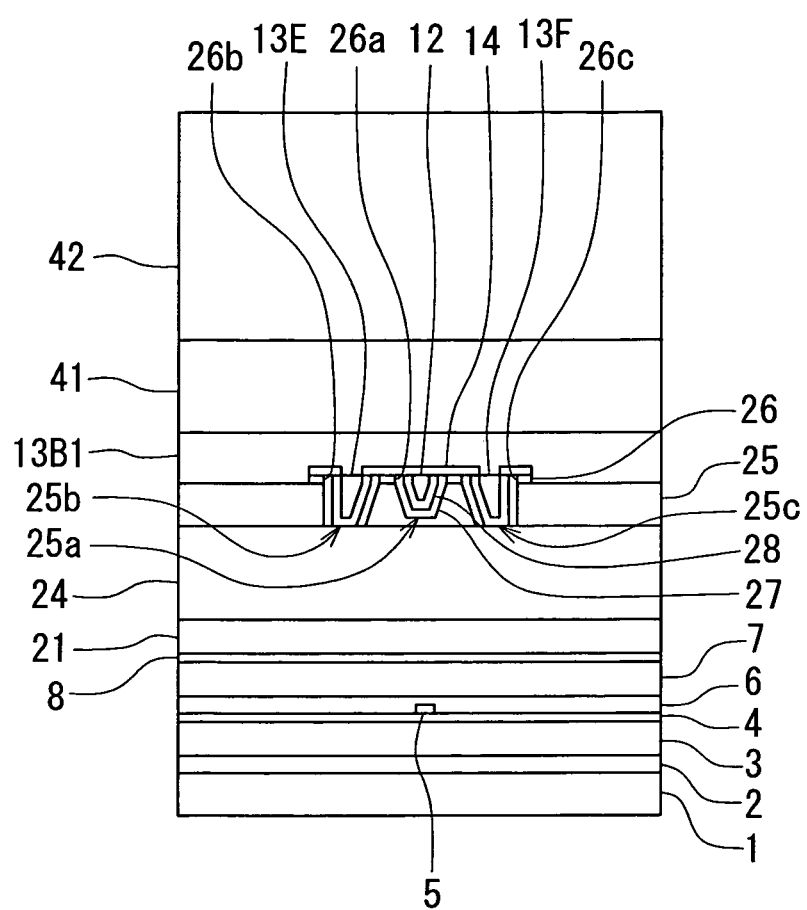
FIG. 26 is a front view of the medium facing surface of a magnetic head of a modification example of the fourth embodiment of the invention.

A modification example of the fourth embodiment will now be described. FIG. 26 is a front view of the medium facing surface of a magnetic head of the modification example. In the modification example the grooves 25b and 25c penetrate the encasing layer 25. At the bottoms of the grooves 25b and 25c, the nonmagnetic film 27 has been removed and the polishing stopper layer 28 touches the top surfaces of the first layer 13A1 (not shown) and the insulating layer 24. The remainder of configuration, function and effects of the modification example are similar to those of the magnetic head illustrated in FIG. 20.

In a method of manufacturing the magnetic head of the modification example, the grooves 25b and 25c are formed to penetrate the encasing layer 25 when the nonmagnetic layer 25P is selectively etched to form the grooves 25a, 25b and 25c. Furthermore, in the method of manufacturing the magnetic head of the modification example, after the nonmagnetic film 27 is formed, portions of the nonmagnetic film 27 are removed by etching at the bottoms of the grooves 25b and 25c. The remainder of steps of the method of manufacturing the magnetic head of the modification example are the same as those of the method illustrated in FIG. 21 to FIG. 25.

[Fifth Embodiment]

Figure 27:
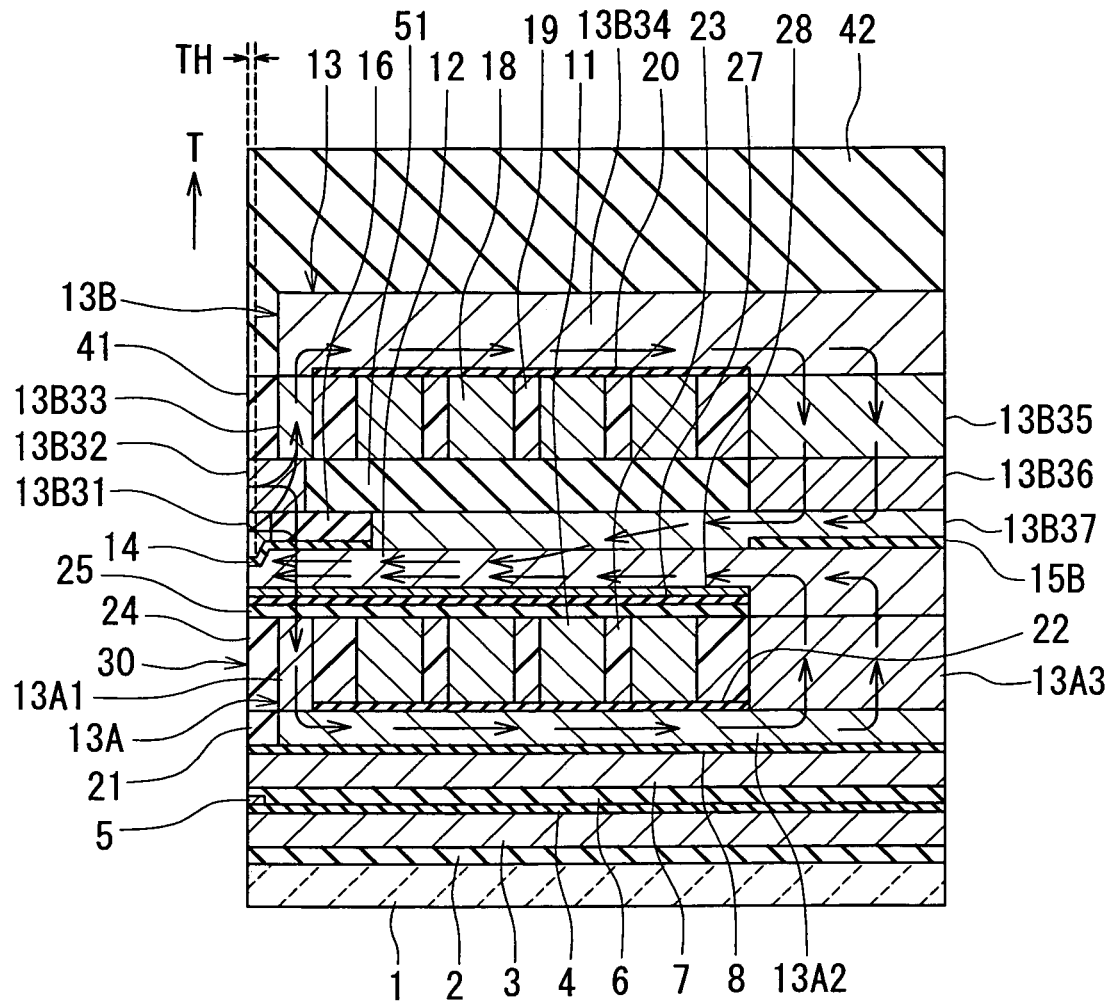
FIG. 27 is a cross-sectional view for illustrating an example of configuration of a magnetic head of a fifth embodiment of the invention.
Figure 28:
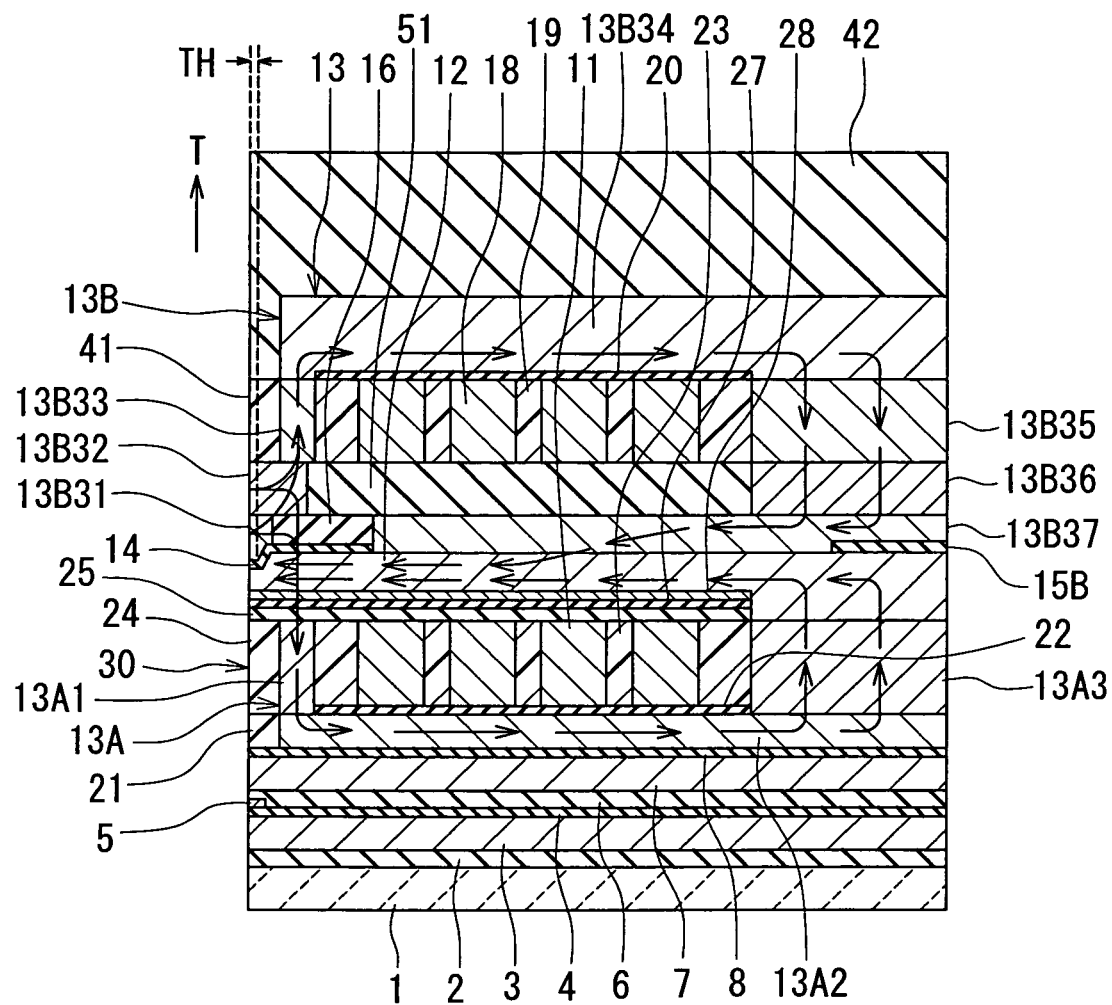
FIG. 28 is a cross-sectional view for illustrating another example of configuration of the magnetic head of the fifth embodiment of the invention.
Figure 29:
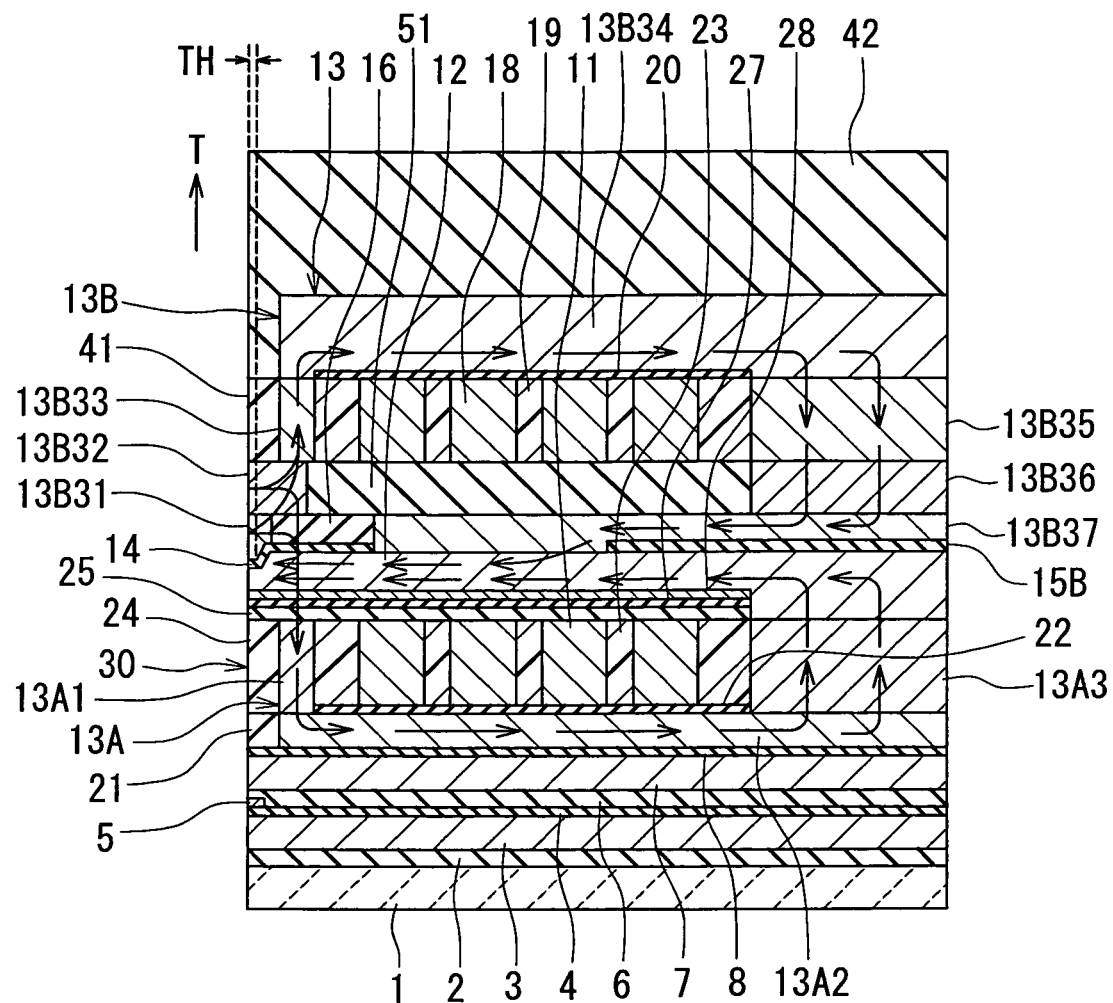
FIG. 29 is a cross-sectional view for illustrating still another example of configuration of the magnetic head of the fifth embodiment of the invention.

Reference is now made to FIG. 27 to FIG. 29 to describe a magnetic head and a method of manufacturing the same of a fifth embodiment of the invention. FIG. 27 to FIG. 29 are cross-sectional views for illustrating the configuration of the magnetic head of the embodiment. FIG. 27 to FIG. 29 each illustrate a cross section orthogonal to the medium facing surface and the plane of the substrate. The arrow indicated with T in FIG. 27 to FIG. 29 shows the direction of travel of a recording medium.

The magnetic head of the fifth embodiment is such one that a nonmagnetic layer 15B made of a nonmagnetic material and disposed between the pole layer 12 and the upper yoke layer 13B37 at a location away from the medium facing surface 30 is further provided in the magnetic head of the third embodiment. In the fifth embodiment, the sixth layer 13B36 is connected to the upper yoke layer 13B37 and disposed on a side of the upper yoke layer 13B37 farther from the pole layer 12. Accordingly, the sixth layer 13B36 corresponds to the 'magnetic layer connected to the yoke layer and disposed on a side of the yoke layer farther from the pole layer' of the invention. The second coil 18 is wound around the sixth layer 13B36 when seen in the direction orthogonal to the interface between the sixth layer 13B36 and the upper yoke layer 13B37 (seen from the top of FIG. 27).

When seen in the direction orthogonal to the interface between the sixth layer 13B36 and the upper yoke layer 13B37, at least a portion of the nonmagnetic layer 15B is disposed in a region that coincides with at least a portion of this interface. The upper yoke layer 13B37 is connected to the pole layer 12 at least at a location closer to the medium facing surface 30 than the nonmagnetic layer 15B. The nonmagnetic layer 15B may be made of a material the same as that of the gap layer 14, for example. The nonmagnetic layer 15B has a thickness equal to or greater than that of the gap layer 14, for example. The thickness of the nonmagnetic layer 15B preferably falls within a range of 0.1 to 0.3 μm inclusive.

In the embodiment, when seen in the direction orthogonal to the interface between the sixth layer 13B36 and the upper yoke layer 13B37, at least a portion of this interface, at least a portion of the interface between the pole layer 12 and the third layer 13A3 of the first portion 13A, and at least a portion of the nonmagnetic layer 15B are disposed in regions that coincide with one another.

The distance between the medium facing surface 30 and an end of the nonmagnetic layer 15B farther from the medium facing surface 30 is preferably equal to or greater than the distance between the medium facing surface 30 and an end of the sixth layer 13B36 farther from the medium facing surface 30.

FIG. 27 to FIG. 29 illustrate three examples in which the locations of an end of the nonmagnetic layer 15B closer to the medium facing surface 30 are different. In the example of FIG. 27, the distance between the medium facing surface 30 and the end of the nonmagnetic layer 15B closer to the medium facing surface 30 is equal to the distance between the medium facing surface 30 and an end of the sixth layer 13B36 closer to the medium facing surface 30. In the example of FIG. 28, the distance between the medium facing surface 30 and the end of the nonmagnetic layer 15B closer to the medium facing surface 30 is greater than the distance between the medium facing surface 30 and the end of the sixth layer 13B36 closer to the medium facing surface 30. In the example of FIG. 29, the distance between the medium facing surface 30 and the end of the nonmagnetic layer 15B closer to the medium facing surface 30 is smaller than the distance between the medium facing surface 30 and the end of the sixth layer 13B36 closer to the medium facing surface 30.

The method of manufacturing the magnetic head of the fifth embodiment comprises the step of forming the nonmagnetic layer 15B on the pole layer 12 before forming the upper yoke layer 13B37.

In FIG. 27 to FIG. 29 the arrows in the pole layer 12 and the shield 13 schematically show the directions in which magnetic fluxes flow. If the nonmagnetic layer 15B is not provided, a magnetic flux flowing from the third layer 13A3 of the first portion 13A into the pole layer 12 and a magnetic flux flowing from the sixth layer 13B36 of the second portion 13B into the upper yoke layer 13B37 repel each other, and the flux density of the pole layer 12 may be thereby reduced. In the fifth embodiment, in contrast, the nonmagnetic layer 15B is provided between the pole layer 12 and the upper yoke layer 13B37 in a region where the third layer 13A3 and the sixth layer 13B36 are opposed to each other. As a result, according to the embodiment, it is possible to suppress repulsion between the flux flowing from the third layer 13A3 into the pole layer 12 and the flux flowing from the sixth layer 13B36 into the upper yoke layer 13B37 in the region where the third layer 13A3 and the sixth layer 13B36 are opposed to each other, as shown in FIG. 27 to FIG. 29. It is thereby possible to prevent a reduction in flux density of the pole layer 12. The remainder of configuration, function and effects of the fifth embodiment are similar to those of the third embodiment.

[Sixth Embodiment]

Figure 30:
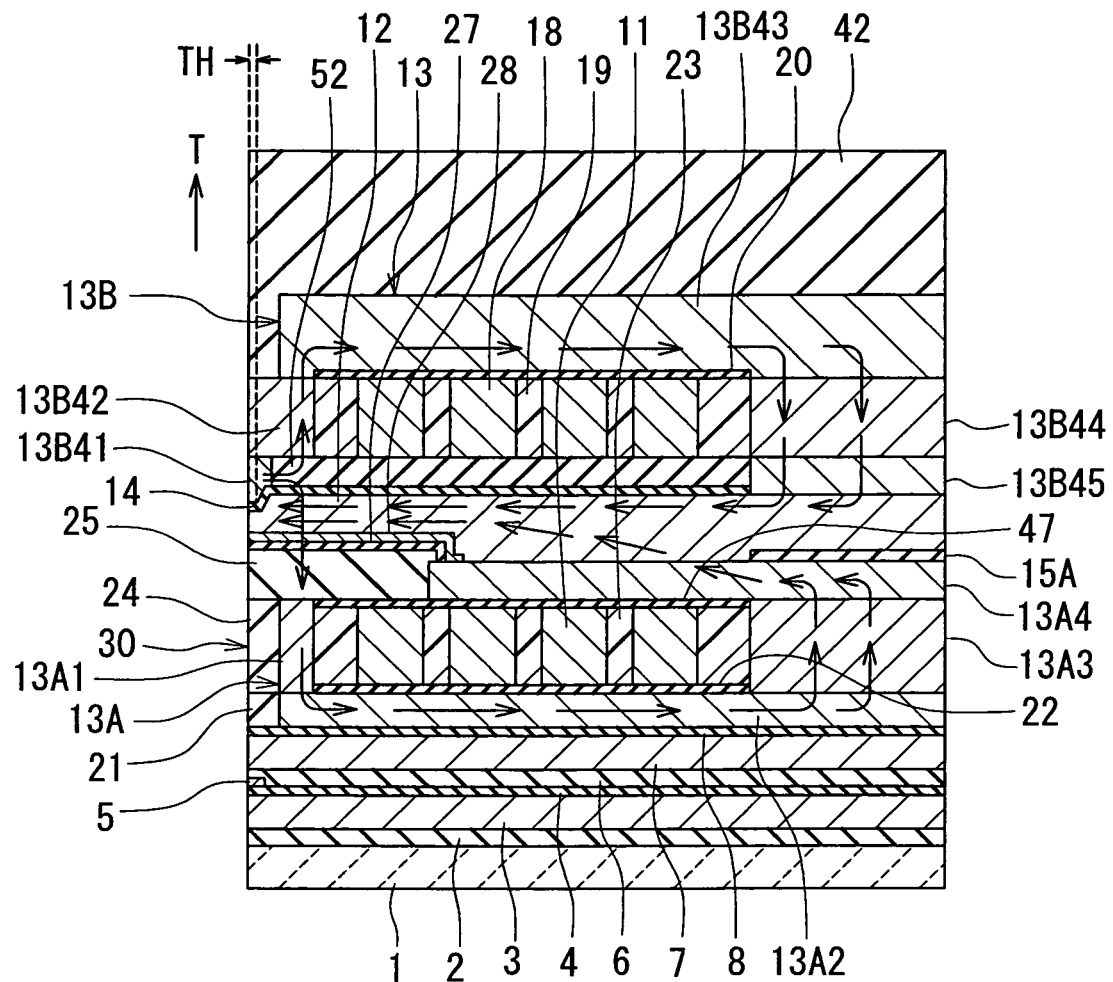
FIG. 30 is a cross-sectional view for illustrating an example of configuration of a magnetic head of a sixth embodiment of the invention.
Figure 31:
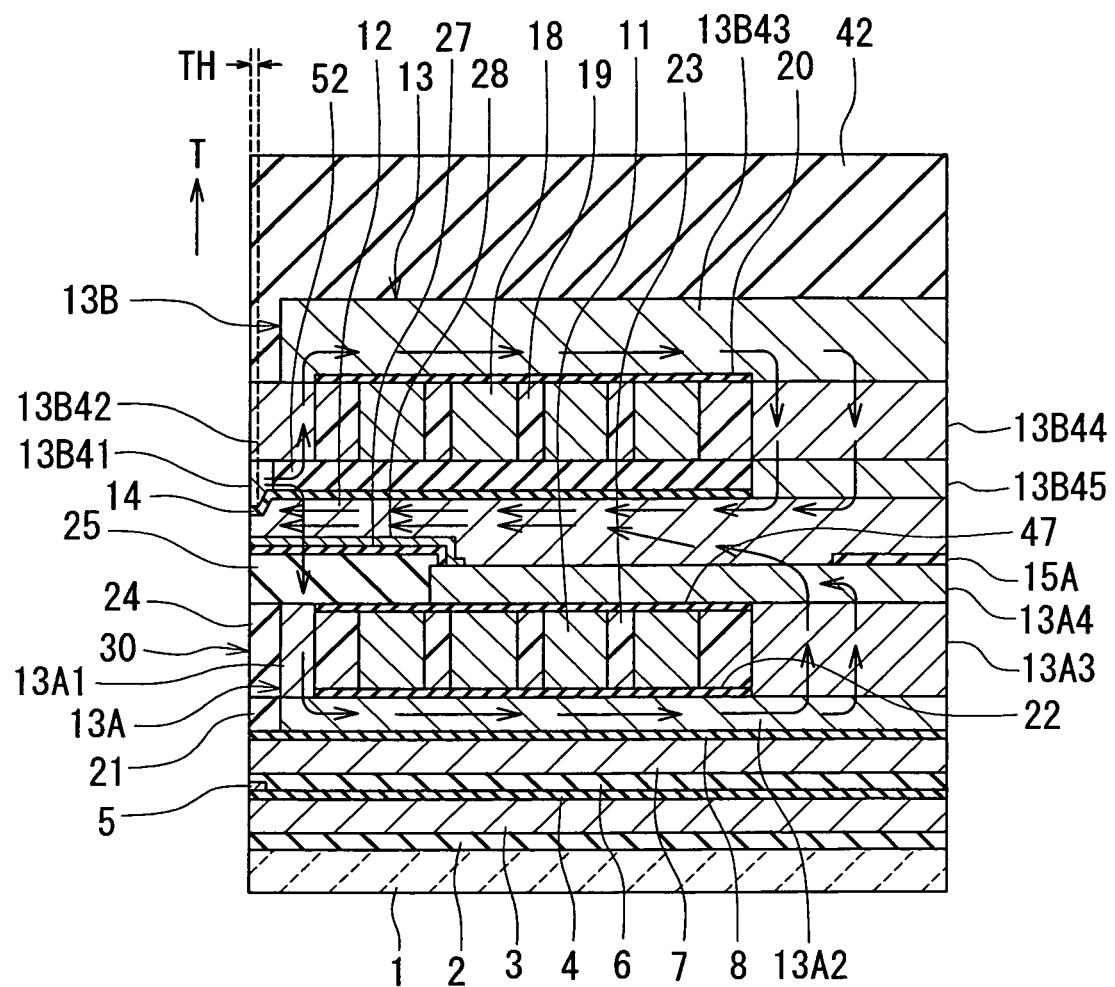
FIG. 31 is a cross-sectional view for illustrating another example of configuration of the magnetic head of the sixth embodiment of the invention.
Figure 32:
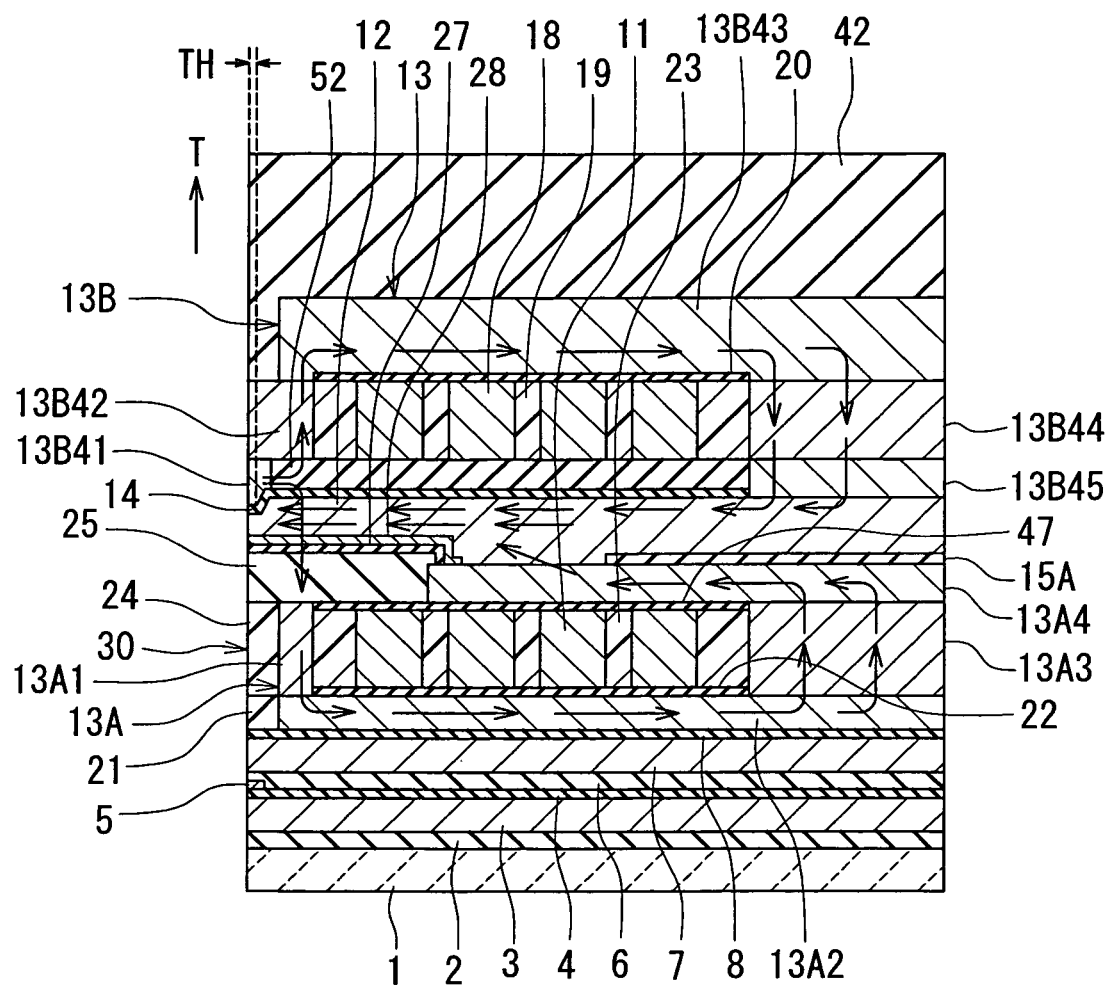
FIG. 32 is a cross-sectional view for illustrating still another example of configuration of the magnetic head of the sixth embodiment of the invention.
Figure 33:
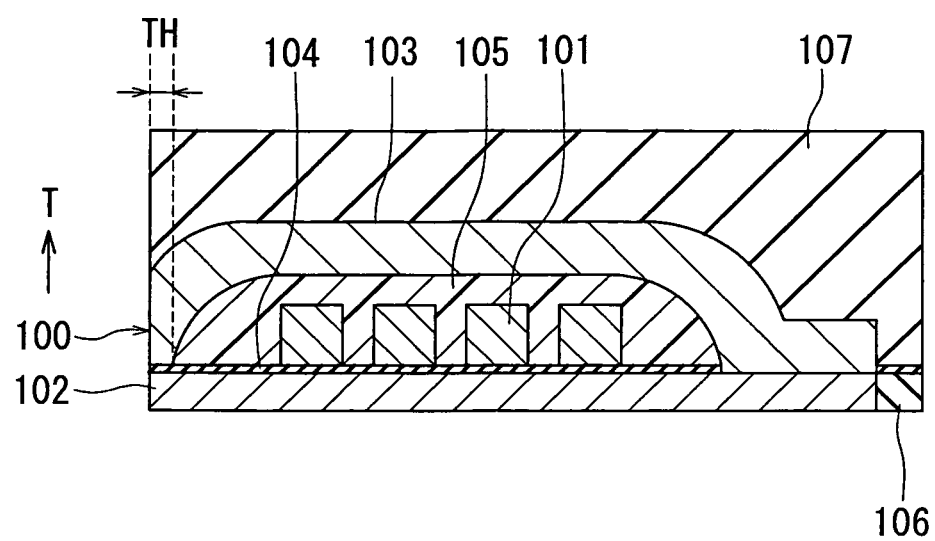
FIG. 33 is a cross-sectional view illustrating a main part of an example of a shield-type head.

Reference is now made to FIG. 30 to FIG. 32 to describe a magnetic head and a method of manufacturing the same of a sixth embodiment of the invention. FIG. 30 to FIG. 32 are cross-sectional views for illustrating the configuration of the magnetic head of the embodiment. FIG. 30 to FIG. 32 each illustrate a cross section orthogonal to the medium facing surface and the plane of the substrate. The arrow indicated with T in FIG. 30 to FIG. 32 shows the direction of travel of a recording medium.

In the magnetic head of the sixth embodiment, an insulating layer 47 is provided to cover the first coil 11 and the insulating layer 23. The insulating layer 47 is made of alumina, for example.

The first portion 13A of the shield 13 of the sixth embodiment incorporates a lower yoke layer 13A4 connected to the pole layer 12 and disposed between the pole layer 12 and a portion of the first coil 11 at a location away from the medium facing surface 30. The lower yoke layer 13A4 has an end face closer to the medium facing surface 30, a bottom surface and a top surface. The end face of the lower yoke layer 13A4 closer to the medium facing surface 30 is located at a distance from the medium facing surface 30. The bottom surface of the lower yoke layer 13A4 touches the third layer 13A3 and the insulating layer 47. The top surface of the lower yoke layer 13A4 touches the pole layer 12. The lower yoke layer 13A4 is made of a material the same as that of each of the first layer 13A1, the second layer 13A2 and the third layer 13A3.

In the sixth embodiment, the third layer 13A3 is connected to the lower yoke layer 13A4 and disposed on a side of the lower yoke layer 13A4 farther from the pole layer 12. Accordingly, the third layer 13A3 corresponds to the 'magnetic layer connected to the yoke layer and disposed on a side of the yoke layer farther from the pole layer' of the invention. The first coil 11 is wound around the third layer 13A3 when seen in the direction orthogonal to the interface between the third layer 13A3 and the lower yoke layer 13A4 (seen from the top of FIG. 30).

The magnetic head of the sixth embodiment further comprises a nonmagnetic layer 15A made of a nonmagnetic material and disposed between the pole layer 12 and the lower yoke layer 13A4. When seen in the direction orthogonal to the interface between the third layer 13A3 and the lower yoke layer 13A4, at least a portion of the nonmagnetic layer 15A is disposed in a region that coincides with at least a portion of this interface. The lower yoke layer 13A4 is connected to the pole layer 12 at least at a location closer to the medium facing surface 30 than the nonmagnetic layer 15A. The nonmagnetic layer 15A may be made of a material the same as that of the gap layer 14, for example.

The second portion 13B of the shield 13 of the embodiment incorporates a first layer 13B41, a second layer 13B42, a third layer 13B43, a fourth layer 13B44, and a fifth layer 13B45. The shape and location of the first layer 13B41 are the same as those of the first layer 13B1 of the first embodiment.

The fifth layer 13B45 is disposed on a region of the pole layer 12 away from the medium facing surface 30 and connected to the pole layer 12. An insulating layer 52 made of an insulating material is disposed around the first layer 13B41 and the fifth layer 13B45. The insulating layer 52 is made of alumina, for example. The first layer 13B41, the fifth layer 13B45 and the insulating layer 52 have flattened top surfaces.

The second layer 13B42 is disposed on the first layer 13B41 and connected to the first layer 13B41. The second layer 13B42 has an end face located in the medium facing surface 30. The fourth layer 13B44 is disposed on a region of the fifth layer 13B45 away from the medium facing surface 30 and connected to the fifth layer 13B45. The coil 18 is wound around the fourth layer 13B44.

In the sixth embodiment the coil 18 and the insulating layer 19 are disposed on the insulating layer 52. As in the first embodiment, the insulating layer 20 is disposed to cover the coil 18 and the insulating layer 19. The third layer 13B43 is disposed to couple the second layer 13B42 to the fourth layer 13B44. The third layer 13B43 has an end face located closer to the medium facing surface 30, and this end face is located at a distance from the medium facing surface 30. As in the first embodiment, the protection layer 42 is disposed to cover the second portion 13B.

In the sixth embodiment, when seen in the direction orthogonal to the interface between the third layer 13A3 and the lower yoke layer 13A4, at least a portion of this interface, at least a portion of the interface between the pole layer 12 and the fifth layer 13B45 of the second portion 13b, and at least a portion of the nonmagnetic layer 15A are disposed in regions that coincide with one another.

The distance between the medium facing surface 30 and an end of the nonmagnetic layer 15A farther from the medium facing surface 30 is preferably equal to or greater than the distance between the medium facing surface 30 and the end of the third layer 13A3 farther from the medium facing surface 30.

FIG. 30 to FIG. 32 illustrate three examples in which the locations of an end of the nonmagnetic layer 15A closer to the medium facing surface 30 are different. In the example of FIG. 30, the distance between the medium facing surface 30 and the end of the nonmagnetic layer 15A closer to the medium facing surface 30 is equal to the distance between the medium facing surface 30 and an end of the third layer 13A3 closer to the medium facing surface 30. In the example of FIG. 31, the distance between the medium facing surface 30 and the end of the nonmagnetic layer 15A closer to the medium facing surface 30 is greater than the distance between the medium facing surface 30 and the end of the third layer 13A3 closer to the medium facing surface 30. In the example of FIG. 32, the distance between the medium facing surface 30 and the end of the nonmagnetic layer 15A closer to the medium facing surface 30 is smaller than the distance between the medium facing surface 30 and the end of the third layer 13A3 closer to the medium facing surface 30.

The method of manufacturing the magnetic head of the sixth embodiment will now be described. The method of manufacturing the magnetic head of the sixth embodiment includes the steps up to the step illustrated in FIG. 7A to FIG. 7C that are the same as those of the first embodiment. In the sixth embodiment, however, in the step illustrated in FIG. 7A to FIG. 7C, the coil 11, the first layer 13A1 and the third layer 13A3 are formed such that the top surface of the coil 11 is located lower than the top surfaces of the first layer 13A1 and the third layer 13A3 (that is, located closer to the substrate 1).

In the following step of the sixth embodiment, the insulating layer 23 made of photoresist, for example, is selectively formed around the coil 11 and in the space between the respective adjacent turns of the coil 11. Next, the insulating layer 47 is formed to cover the coil 11 and the insulating layer 23. Next, the insulating layer 24 is formed on the entire top surface of the layered structure. Next, the insulating layer 24 is polished by CMP, for example, so that the first layer 13A1, the third layer 13A3 and the insulating layer 47 are exposed, and the top surfaces of the first layer 13A1, the third layer 13A3, and the insulating layers 24 and 47 are thereby flattened.

The following steps of the sixth embodiment are the same as the steps of the first embodiment illustrated in FIG. 9A to FIG. 17A, FIG. 9B to FIG. 17B, and FIG. 9C to FIG. 17C, except differences that will now be described. First, in the sixth embodiment, the lower yoke layer 13A4 is formed at the same time when the coupling portions 13C1 and 13C2 are formed in the step illustrated in FIG. 9A to FIG. 9C. In the sixth embodiment, in the step illustrated in FIG. 11A to FIG. 11C, a portion of the encasing layer 25 located on the lower yoke layer 13A4 is selectively etched to form an opening at the bottom of the groove 25a. In the sixth embodiment, in the step illustrated in FIG. 12A to FIG. 12C, portions of the nonmagnetic film 27 and the polishing stopper layer 28 located in the opening at the bottom of the groove 25a are selectively etched to form openings in the nonmagnetic film 27 and the polishing stopper layer 28. Next, the nonmagnetic layer 15A is formed on the lower yoke layer 13A4 exposed from this opening. In the sixth embodiment, in the step illustrated in FIG. 16A to FIG. 16C, the first layer 13B41, the fifth layer 13B45 and the insulating layer 52 are formed in place of the first layer 13B1, the upper yoke layer 13B5 and the nonmagnetic layer 16. In the sixth embodiment, in the step illustrated in FIG. 17A to FIG. 17C, the insulating layer 17 is not formed, and the second layer 13B42 and the fourth layer 13B44 are formed in place of the second layer 13B2 and the fourth layer 13B4. In the sixth embodiment, after the step illustrated in FIG. 17A to FIG. 17C, the third layer 13B43 is formed in place of the third layer 13B3.

In FIG. 30 to FIG. 32 the arrows in the pole layer 12 and the shield 13 schematically show the directions in which magnetic fluxes flow. If the nonmagnetic layer 15A is not provided, a magnetic flux flowing from the third layer 13A3 of the first portion 13A into the lower yoke layer 13A4 and a magnetic flux flowing from the fifth layer 13B45 of the second portion 13B into the pole layer 12 repel each other, and the flux density of the pole layer 12 may be thereby reduced. In the sixth embodiment, in contrast, the nonmagnetic layer 15A is provided between the pole layer 12 and the lower yoke layer 13A4 in a region where the third layer 13A3 and the fifth layer 13B45 are opposed to each other. As a result, according to the embodiment, it is possible to suppress repulsion between the flux flowing from the third layer 13A3 into the lower yoke layer 13A4 and the flux flowing from the fifth layer 13B45 into the pole layer 12 in the region where the third layer 13A3 and the fifth layer 13B45 are opposed to each other, as shown in FIG. 30 to FIG. 32. It is thereby possible to prevent a reduction in flux density of the pole layer 12. The remainder of configuration, function and effects of the sixth embodiment are similar to those of the first embodiment.

The present invention is not limited to the foregoing embodiments but may be practiced in still other ways. For example, in any of the first, second and fourth embodiments, a nonmagnetic layer may be provided between the pole layer and the yoke layer as in the fifth or sixth embodiment.

In the invention the pole layer may have a penetrating hole, and the coupling portion that couples the first and second portions of the shield to each other may pass through this hole without touching the pole layer and couple the first and second portions to each other.

The pole layer of the invention is not limited to the one formed in the manner disclosed in each of the embodiments but may be formed otherwise. For example, the pole layer may be formed by patterning a magnetic layer by etching, or may be formed by frame plating. The pole layer may have a flat top surface.

While the magnetic head disclosed in each of the embodiments has such a configuration that the read head is formed on the base body and the write head is stacked on the read head, it is also possible that the read head is stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:
   a medium facing surface that faces toward a recording medium;
   a first coil and a second coil each generating a magnetic field corresponding to data to be written on the recording medium;
   a pole layer having an end face located in the medium facing surface, allowing a magnetic flux corresponding to the field generated by each of the first and second coils to pass therethrough, and generating a write magnetic field for writing the data on the recording medium by means of a perpendicular magnetic recording system; and
   a shield, wherein:
   the shield incorporates: a first portion located backward of the pole layer along a direction of travel of the recording medium; and a second portion located forward of the pole layer along the direction of travel of the recording medium;
   each of the first and second portions is connected to the pole layer at a location away from the medium facing surface;

the first portion is recessed away from the medium facing surface;

the second portion includes a first layer and a second layer, the first layer having an end face located in the medium facing surface, the second layer being located forward of the first layer along the direction of travel of the recording medium and connected to the first layer;

part of the first coil passes through a space surrounded by the pole layer and the first portion; and part of the second coil passes through a space surrounded by the pole layer and the second portion, the magnetic head further comprising:

a coupling portion coupling the first portion and the first layer to each other without touching the pole layer; and a gap layer made of a nonmagnetic material and disposed between the pole layer and the first layer, wherein:

in the medium facing surface, the end face of the first layer is located forward of the end face of the pole layer along the direction of travel of the recording medium with a specific space created therebetween by a thickness of the gap layer;

the end face of the pole layer has a side located adjacent to the gap layer, the side defining a track width;

the first layer incorporates a middle portion including a portion opposed to the pole layer with the gap layer disposed in between, and two side portions located outside the middle portion along a direction of track width, and a maximum length of each of the side portions taken in a direction orthogonal to the medium facing surface is greater than a length of the middle portion taken in the direction orthogonal to the medium facing surface; and the second layer is recessed away from the medium facing surface and does not touch the middle portion but touches the two side portions.

2. The magnetic head according to claim 1, wherein the thickness of the gap layer falls within a range of 5 to 60 nm inclusive.

3. The magnetic head according to claim 1, wherein the coupling portion couples the first portion and the first layer to each other on both sides of the pole layer, the sides being opposed to each other in the direction of track width.

4. The magnetic head according to claim 1, wherein the end face of the pole layer located in the medium facing surface has a width that decreases as a distance from the gap layer increases.

5. The magnetic head according to claim 1, wherein:

the second portion further includes: a yoke layer connected to the pole layer and disposed between the pole layer and the part of the second coil at a location away from the medium facing surface; and a magnetic layer connected to the yoke layer and disposed on a side of the yoke layer farther from the pole layer; and the second coil is wound around the magnetic layer when seen in a direction orthogonal to an interface between the magnetic layer and the yoke layer, the magnetic head further comprising a nonmagnetic layer made of a nonmagnetic material and disposed between the pole layer and the yoke layer, wherein:

at least a portion of the nonmagnetic layer is located in a region that coincides with at least a portion of the interface between the magnetic layer and the yoke layer when seen in the direction orthogonal to the interface; and the yoke layer is connected to the pole layer at least at a location closer to the medium facing surface than the nonmagnetic layer.

6. The magnetic head according to claim 1, wherein:

the first portion includes: a yoke layer connected to the pole layer and disposed between the pole layer and the part of the first coil at a location away from the medium facing surface; and a magnetic layer connected to the yoke layer and disposed on a side of the yoke layer farther from the pole layer; and the first coil is wound around the magnetic layer when seen in a direction orthogonal to an interface between the magnetic layer and the yoke layer, the magnetic head further comprising a nonmagnetic layer made of a nonmagnetic material and disposed between the pole layer and the yoke layer, wherein:

at least a portion of the nonmagnetic layer is located in a region that coincides with at least a portion of the interface between the magnetic layer and the yoke layer when seen in the direction orthogonal to the interface; and the yoke layer is connected to the pole layer at least at a location closer to the medium facing surface than the nonmagnetic layer.

7. The magnetic head according to claim 1, further comprising an encasing layer made of a nonmagnetic material, the encasing layer having a groove that opens in a top surface thereof and that accommodates at least part of the pole layer.

8. The magnetic head according to claim 1, wherein the coupling portion is recessed away from the medium facing surface.

9. A method of manufacturing a magnetic head for perpendicular magnetic recording, the magnetic head comprising:

a medium facing surface that faces toward a recording medium;

a first coil and a second coil each generating a magnetic field corresponding to data to be written on the recording medium;

a pole layer having an end face located in the medium facing surface, allowing a magnetic flux corresponding to the field generated by each of the first and second coils to pass therethrough, and generating a write magnetic field for writing the data on the recording medium by means of a perpendicular magnetic recording system; and a shield, wherein:

the shield incorporates: a first portion located backward of the pole layer along a direction of travel of the recording medium; and a second portion located forward of the pole layer along the direction of travel of the recording medium;

each of the first and second portions is connected to the pole layer at a location away from the medium facing surface;

the first portion is recessed away from the medium facing surface;

the second portion includes a first layer and a second layer, the first layer having an end face located in the medium facing surface, the second layer being located forward of the first layer along the direction of travel of the recording medium and connected to the first layer;

part of the first coil passes through a space surrounded by the pole layer and the first portion; and part of the second coil passes through a space surrounded by the pole layer and the second portion, the magnetic head further comprising:

a coupling portion coupling the first portion and the first layer to each other without touching the pole layer; and a gap layer made of a nonmagnetic material and disposed between the pole layer and the first layer, wherein:

in the medium facing surface, the end face of the first layer is located forward of the end face of the pole layer along the direction of travel of the recording medium with a specific space created therebetween by a thickness of the gap layer;

the end face of the pole layer has a side located adjacent to the gap layer, the side defining a track width;

the first layer incorporates a middle portion including a portion opposed to the pole layer with the gap layer disposed in between, and two side portions located outside the middle portion along a direction of track width, and a maximum length of each of the side portions taken in a direction orthogonal to the medium facing surface is greater than a length of the middle portion taken in the direction orthogonal to the medium facing surface; and the second layer is recessed away from the medium facing surface and does not touch the middle portion but touches the two side portions, the method comprising the steps of:
forming the first portion;
forming the first coil;
forming the coupling portion;
forming the pole layer;
forming the gap layer on the pole layer;
forming the second coil; and
forming the second portion on the gap layer.

10. The method according to claim 9, wherein the thickness of the gap layer falls within a range of 5 to 60 nm inclusive.

11. The method according to claim 9, wherein the coupling portion couples the first portion and the first layer to each other on both sides of the pole layer, the sides being opposed to each other in the direction of track width.

12. The method according to claim 9, wherein the end face of the pole layer located in the medium facing surface has a width that decreases as a distance from the gap layer increases.

13. The method according to claim 9, wherein:

the second portion further includes: a yoke layer connected to the pole layer and disposed between the pole layer and the part of the second coil at a location away from the medium facing surface; and a magnetic layer connected to the yoke layer and disposed on a side of the yoke layer farther from the pole layer;

the second coil is wound around the magnetic layer when seen in a direction orthogonal to an interface between the magnetic layer and the yoke layer;

the magnetic head further comprises a nonmagnetic layer made of a nonmagnetic material and disposed between the pole layer and the yoke layer;

at least a portion of the nonmagnetic layer is located in a region that coincides with at least a portion of the interface between the magnetic layer and the yoke layer when seen in the direction orthogonal to the interface; and the yoke layer is connected to the pole layer at least at a location closer to the medium facing surface than the nonmagnetic layer, the method further comprising the step of forming the nonmagnetic layer on the pole layer.

14. The method according to claim 9, wherein:

the first portion includes: a yoke layer connected to the pole layer and disposed between the pole layer and the part of the first coil at a location away from the medium facing surface; and a magnetic layer connected to the yoke layer and disposed on a side of the yoke layer farther from the pole layer;

the first coil is wound around the magnetic layer when seen in a direction orthogonal to an interface between the magnetic layer and the yoke layer;

the magnetic head further comprises a nonmagnetic layer made of a nonmagnetic material and disposed between the pole layer and the yoke layer;

at least a portion of the nonmagnetic layer is located in a region that coincides with at least a portion of the interface between the magnetic layer and the yoke layer when seen in the direction orthogonal to the interface; and the yoke layer is connected to the pole layer at least at a location closer to the medium facing surface than the nonmagnetic layer, the method further comprising the step of forming the nonmagnetic layer on the yoke layer.

15. The method according to claim 9, wherein the magnetic head further comprises an encasing layer made of a nonmagnetic material, the encasing layer having a groove that opens in a top surface thereof and that accommodates at least part of the pole layer, the method further comprising the step of forming the encasing layer.

16. The method according to claim 9, wherein the coupling portion is recessed away from the medium facing surface.

* * * * *